(12) United States Patent
Kawakami et al.

(10) Patent No.: US 10,130,978 B2
(45) Date of Patent: Nov. 20, 2018

(54) CLEANING METHOD OF OIL TANK AND CLEANING DEVICE OF SAME

(71) Applicants: SOFTARD INDUSTRIES CO., LTD., Tokyo (JP); JX Nippon Oil & Energy Corporation, Tokyo (JP)

(72) Inventors: Katsuhiko Kawakami, Tokyo (JP); Guiqing Xu, Tokyo (JP); Masayuki Kidokoro, Tokyo (JP); Yasuo Uchida, Tokyo (JP); Masanao Kato, Tokyo (JP); Masanao Mitsuhata, Tokyo (JP); Shouzou Sugihara, Kanagawa (JP); Tsukasa Mitsuta, Tokyo (JP); Takayuki Nakazawa, Tokyo (JP)

(73) Assignees: SOFTARD INDUSTRIES CO., LTD., Tokyo (JP); JXTG NIPPON OIL & ENERGY CORPORATION, Tokyo (JP)

( * ) Notice: Subject to any disclaimer, the term of this patent is extended or adjusted under 35 U.S.C. 154(b) by 138 days.

(21) Appl. No.: 14/885,242

(22) Filed: Oct. 16, 2015

(65) Prior Publication Data
US 2016/0107206 A1    Apr. 21, 2016

(30) Foreign Application Priority Data

Oct. 20, 2014    (JP) .................................. 2014-213918

(51) Int. Cl.
*B08B 9/08*      (2006.01)
*B08B 9/093*      (2006.01)
(Continued)

(52) U.S. Cl.
CPC ........ *B08B 9/0933* (2013.01); *B01D 21/2472* (2013.01); *B01F 5/02* (2013.01)

(58) Field of Classification Search
None
See application file for complete search history.

(56) References Cited

U.S. PATENT DOCUMENTS

| | | | | |
|---|---|---|---|---|
| 4,426,233 A | * | 1/1984 | Manabe | ................ B08B 9/0933 134/21 |
| 6,041,793 A | * | 3/2000 | Miyasaki | .............. B08B 9/0933 134/168 R |

(Continued)

FOREIGN PATENT DOCUMENTS

| JP | S54-0030667 | 3/1979 |
|---|---|---|
| JP | S56-002879 | 1/1981 |

(Continued)

OTHER PUBLICATIONS

Japanese Office Action dated Oct. 17, 2017, English translation included, 8 pages.

*Primary Examiner* — Mikhail Kornakov
*Assistant Examiner* — Ryan L. Coleman
(74) *Attorney, Agent, or Firm* — Rankin, Hill & Clark LLP

(57) ABSTRACT

Crude oil is discharged from an oil tank. A nozzle is inserted into a support opening formed in advance on a roof of the oil tank. A cleaning liquid containing LCO is injected from the nozzle over the sludge accumulated inside the oil tank after the crude oil is discharged from the oil tank. The cleaning liquid in which the sludge is dissolved is discharged from the oil tank and is returned to the oil tank for recycle cleaning. Subsequently, the cleaning liquid in which the sludge is dissolved is discharged from the oil tank.

7 Claims, 6 Drawing Sheets

(51) Int. Cl.
*B01F 5/02* (2006.01)
*B01D 21/24* (2006.01)

(56) References Cited

U.S. PATENT DOCUMENTS

| | | | | |
|---|---|---|---|---|
| 6,852,683 | B1* | 2/2005 | Mukogawa | C11D 3/18 |
| | | | | 510/365 |
| 8,628,628 | B1* | 1/2014 | Bonner | F28G 9/00 |
| | | | | 134/166 R |
| 2009/0071510 | A1* | 3/2009 | Hancock | B08B 9/0933 |
| | | | | 134/22.18 |

FOREIGN PATENT DOCUMENTS

| | | |
|---|---|---|
| JP | S56-133097 | 10/1981 |
| JP | H06-099157 | 4/1994 |
| JP | H06-126262 | 5/1994 |
| JP | H10-165707 | 6/1998 |
| JP | 2001-300587 | 10/2001 |
| JP | 2002-338969 | 11/2002 |
| JP | 2005-349240 | 12/2005 |
| JP | 2007-146166 | 6/2007 |
| JP | 4468057 | 5/2010 |
| JP | 2014-097442 | 5/2014 |

* cited by examiner

CLEANING METHOD OF OIL TANK AND CLEANING DEVICE OF SAME

The entire disclosure of Japanese Patent Application No. 2014-213918 filed Oct. 20, 2014 is expressly incorporated by reference herein.

TECHNICAL FIELD

The present invention relates to a cleaning method and a cleaning device of an oil tank such as a crude oil tank.

BACKGROUND ART

An oil tank in a refinery is opened and an inside of the oil tank is inspected on a regular basis. In order to open the oil tank and inspect the inside thereof, it is necessary to remove crude oil from the oil tank and clean the inside of the oil tank.

In order to clean the inside of the oil tank, it is necessary to remove sludge accumulated on a bottom of the oil tank. However, since the sludge is stuck to the bottom and side walls of the oil tank, an operation of removing the sludge is not easy.

In order to remove the sludge from the oil tank, a typical technique of heating, stirring and circulating a composition containing light gas oil (LGO) or crude oil and a surfactant to fluidize the sludge in the crude oil tank and discharge the sludge therefrom is disclosed (Patent Literature 1: JP-A-2001-300587). In a typical example of Patent Literature 1, the composition is stirred with a stirring propeller and a stirrer provided in the crude oil tank and is circulated through pipes and pumps provided in the crude oil tank Moreover, a typical technique of contacting a sludge removal agent containing hydrocarbon compounds of light oil, heavy oil, crude oil and the like with the sludge inside the oil tank, removing the obtained sludge-containing sludge removal agent out of the oil tank, heating the obtained sludge-containing sludge removal agent, returning the heated sludge-containing sludge removal agent to the oil tank, removing a part of the heated sludge-containing sludge removal agent, separating the part of the heated sludge-containing sludge removal agent into a solid content and a recycled sludge removal agent, returning the recycled sludge removal agent to a sludge-removal-agent circulation line, removing a part of the recycled sludge removal agent, and separating the removed part of the recycled-sludge removal agent into three components of an oil content, a water content and a solid content is disclosed (Patent Literature 2: JP Patent No. 4468057). In a typical example of Patent Literature 2, the sludge removal agent is fed over the sludge by a cleaning device provided inside the tank.

In the typical example of Patent Literature 1, the composition containing light gas oil (LGO) or crude oil and a surfactant is used as a cleaning agent. In the typical example of Patent Literature 2, the composition containing hydrocarbon compounds of light oil, heavy oil, crude oil and the like is used as the cleaning agent. Accordingly, in the typical examples of Patent Literatures 1 and 2, some effects for removing the sludge can be observed, but are still unsatisfactory under circumstances where speedy and efficient cleaning of the oil tank is required. Specifically, since a main component of the sludge is wax or asphaltene of the oil and the rest of the components are ash, water and the like, the tank cleaning liquid containing LGO and the crude oil in the typical examples cannot exhibit a sufficient detergency.

Further, in the typical example of Patent Literature 1, since the composition is stirred with the stirring propeller and the stirrer provided inside the crude oil tank, a large cost for removing the sludge is required. Further, since the composition is circulated through the pipes and the pumps, the composition and the sludge in the tank cannot be sufficiently stirred only with the above pipes and pumps, so that the sludge cannot be sufficiently discharged from the oil tank.

In the typical example of Patent Literature 2, since the sludge removal agent is fed into the tank by the cleaning device provided inside the tank, a large cost for removing the sludge is required as in the typical example of the Patent Literature 1.

SUMMARY OF THE INVENTION

An object of the invention is to provide a cleaning method and a cleaning device of an oil tank with a high cleaning effect and a reduced cost for cleaning.

According to an aspect of the invention, a method of cleaning an inside of an oil tank provided with a roof having an existing opening includes: a preparation step of inserting a nozzle into the existing opening; a cleaning step of injecting from the nozzle a cleaning liquid containing LCO (Light Cycle Oil) obtained by distillation of hydrocarbon oil by fluid catalytic cracking to sludge accumulated in the inside of the oil tank after crude oil is discharged from the oil tank to dissolve the sludge with the cleaning liquid, discharging the cleaning liquid in which the sludge is dissolved from the oil tank, and returning the cleaning liquid in which the sludge is dissolved to the oil tank; and a sludge discharging step of discharging the cleaning liquid in which the sludge is dissolved from the oil tank after cleaning the inside of the oil tank.

In the above aspect of the invention, after the crude oil is discharged from the oil tank before cleaning the oil tank, remaining sludge becomes stuck inside the oil tank. Subsequently, in the preparation step, the nozzle is inserted into the existing opening formed in advance on the roof Herein, examples of the existing opening include: a support opening used for a roof support pipe supporting the roof; and a manhole.

In the cleaning step, the cleaning liquid containing LCO is injected from the nozzle toward the sludge. The sludge is dissolved by the cleaning liquid.

The cleaning liquid in which the sludge is dissolved is discharged from the oil tank and subsequently returned to the oil tank. By repeating this step, the sludge accumulated inside the oil tank is circulated together with the cleaning liquid to avoid accumulation of the sludge on the bottom of the oil tank.

After the cleaning step is finished, in the sludge discharge step, the cleaning liquid in which the sludge is dissolved is discharged to an outside of the oil tank. The discharged liquid is recycled separately.

For the above operation, the cleaning liquid in the above aspect of the invention contains LCO. LCO is a half-finished product of FCC (Fluid Catalytic Cracking). Since LCO has a lot of benzene rings, LCO exhibits an excellent performance of dissolving the sludge as compared with LGO and the like, so that the cleaning effect is high. Moreover, since LCO per se is a liquid at ordinary temperatures and is formed of polycyclic hydrocarbons different from those for the sludge, such a recombination as being caused by the same kinds of hydrocarbons is unlikely to occur to avoid reaggregation.

Further, since the existing opening (e.g., the support opening) formed on the roof is used for feeding the cleaning liquid inside the oil tank in the above aspect of the invention, a cleaning operation in this arrangement is easier than that in a typical arrangement with a cleaning device and a stirrer inside the oil tank, so that a cleaning cost can be reduced.

In the method with the above arrangement, it is preferable that the sludge contains a soft sludge forming an upper layer and a hard sludge forming a lower layer, the cleaning liquid includes a soft sludge cleaning liquid for dissolving the soft sludge and a hard sludge cleaning liquid for dissolving the hard sludge, the soft sludge cleaning liquid contains the LCO and crude oil, and the hard sludge cleaning liquid contains the LCO and a chemical agent containing a surfactant and limonene.

Owing to the study of the inventors of the invention, it was found that components of the sludge accumulated in the oil tank are different depending on parts of the sludge. In the oil tank, it is expected that the component (e.g., asphaltene) having a heavy specific gravity is initially deposited to form sludge. When the heavy component is initially deposited, the lower layer of the sludge becomes hard and the upper layer thereof becomes soft. Accordingly, it is assumed that the pour point of the lower layer of the sludge becomes higher than that of the upper layer thereof. Since the pour points are thus different in the upper and lower layers of the sludge, it is assumed that the heavy fraction is deposited in the lower layer.

Accordingly, in the aspect of the invention, types of the cleaning liquid are made different respectively for the upper layer and the lower layer of which the respective components are different, so that more efficient discharge of the sludge can be achieved.

Specifically, in order to clean the hard sludge containing asphaltene, the cleaning liquid containing the chemical agent added with a surfactant and limonene is used. When the chemical agent added with the surfactant and limonene is added to the sludge, the chemical agent becomes widespread on a surface of the aggregation of the sludge and contacts with petroleum used as a diluent to make the surface of the aggregation wet. For this reason, the aggregations become slippery to each other, so that the viscosity is decreased and the fluidity is increased. Further, because of electrostatic action of negative charges adhering on the surfaces of the aggregations, the aggregations repel each other to be separated. As a result, a distance between the aggregations is increased to weaken an intermolecular force, so that dissolution and dispersion of the aggregations in LCO are promoted. Accordingly, the aggregations are gradually dissolved and dispersed in LCO (i.e., a diluent) to become small and float. Further, the dissolved, dispersed and floating aggregations are stirred by the cleaning liquid injected from the nozzle, so that a structure of the aggregations is broken. For the above reasons, by adding the chemical agent to LCO to form the cleaning liquid, the pour point of the sludge is decreased to allow the sludge to be fluidized, dissolved and dispersed even at low temperatures, so that the sludge can be removed from the oil tank.

On the other hands, in order to clean the soft sludge, the chemical agent is not necessarily required for the cleaning liquid since the soft sludge per se contains less asphaltene, although the hard sludge cleaning liquid may be used for cleaning the soft sludge. Thus, since the cleaning liquid containing no chemical agent is usable, the cost for discharging the sludge is reducible. It should be noted that the crude oil discharged from the oil tank is preferably used as the crude oil to be contained in the soft sludge cleaning liquid. When the crude oil is used for the cleaning liquid, the sludge and the crude oil are compatible in the oil tank, thereby facilitating the discharge of the sludge.

In the method with the above arrangement, it is preferable that the hard sludge cleaning liquid contains an amount of the LCO at 1.0 time or more relative to an amount of the hard sludge accumulated in the oil tank.

With this arrangement, since the ratio of LCO to the hard sludge falls within an appropriate range, the hard sludge can be efficiently discharged from the oil tank. In other words, when the amount of LCO is less than 1.0 time as much as the amount of the hard sludge, the cleaning liquid containing the hard sludge becomes highly viscous to lose fluidity.

In the method with the above arrangement, it is preferable that the hard sludge cleaning liquid contains crude oil.

With this arrangement, since the hard sludge cleaning liquid contains the crude oil, the kinematic viscosity of the hard sludge cleaning liquid is lower than that of the hard sludge cleaning liquid containing no crude oil, thereby facilitating the discharge of the hard sludge. It should be noted that the crude oil discharged from the oil tank is preferably used as the crude oil to be contained in the hard sludge cleaning liquid. When the crude oil is used for the cleaning liquid, the sludge and the crude oil are compatible in the oil tank, thereby facilitating the discharge of the sludge.

In the method with the above arrangement, it is preferable that the cleaning step includes: a circulation step of discharging the cleaning liquid in which the sludge is dissolved from the oil tank and returning the cleaning liquid in which the sludge is dissolved to the oil tank; and a back-flow step of back-flowing the cleaning liquid in which the sludge is dissolved in a direction opposite from a circulation direction of the cleaning liquid in which the sludge is dissolved in the circulation step.

With this arrangement, since the cleaning step includes the back-flow step in addition to the circulation step, the sludge can be efficiently dissolved in the cleaning liquid housed inside the oil tank. Accordingly, the sludge can be easily discharged in the discharge step.

In the method with the above arrangement, it is preferable that the cleaning step includes: a soft sludge cleaning step of cleaning the soft sludge with the soft sludge cleaning liquid; and a hard sludge cleaning step of cleaning the hard sludge with the hard sludge cleaning liquid, the sludge discharging step includes: a soft sludge discharging step of discharging the cleaning liquid in which the soft sludge is dissolved from the oil tank; and a hard sludge discharging step of discharging the cleaning liquid in which the hard sludge is dissolved from the oil tank, and the hard sludge discharging step is conducted after the soft sludge discharging step.

With this arrangement, since the cleaning and the discharge of the soft sludge and the hard sludge of which the respective components are different are conducted with different arrangements, the oil tank can be efficiently cleaned.

In the method with the above arrangement, it is preferable that the preparation step includes a sludge measurement step of measuring an amount of the sludge accumulated in the inside of the oil tank after the crude oil is discharged and before the nozzle is inserted to the existing opening.

With this arrangement, the amount of the sludge is measured after the crude oil is discharged. For instance, a measuring rod is inserted toward the bottom of the oil tank through each of a plurality of existing openings on the roof, so that the amount of the sludge is estimated based on a dimension of the sludge accumulated at each of positions of the measuring rods. With this operation, the amount of the cleaning liquid discharged from the nozzle relative to the sludge can be made appropriate.

In the method with the above arrangement, it is preferable that the sludge discharging step includes a sludge measurement step of measuring an amount of the sludge accumulated in the inside of the oil tank.

With this arrangement, since the amount of the sludge left on the bottom of the oil tank is measured, the sludge discharge step can be reliably conducted after confirming that no sludge is left.

In the method with the above arrangement, it is preferable that the sludge discharging step further includes feeding water to the oil tank after the fluid in which the sludge is dissolved is discharged.

With this arrangement, even if some sludge is left on the bottom of the oil tank, the sludge can be discharged to the outside together with water and further deodorization inside the oil tank can be conducted.

According to another aspect of the invention, a device of cleaning an inside of an oil tank provided with a roof having an existing opening includes: a nozzle that injects a cleaning liquid containing LCO (Light Cycle Oil) obtained by distillation of hydrocarbon oil by fluid catalytic cracking to sludge accumulated in the inside of the oil tank; a cleaning liquid injection line; a circulation line through which the cleaning liquid in which the sludge is dissolved is discharged from the oil tank and returned to the oil tank; a discharge line through which the cleaning liquid in which the sludge is dissolved is discharged from the oil tank; and a cleaning liquid feeding line that is connected to the circulation line and through which the cleaning liquid is fed to the nozzle, the nozzle being capable of being inserted into the existing opening and having an alterable injection posture.

In the above aspect of the invention, a cleaning device capable of producing the above-described advantages can be provided. Particularly, since the injection posture of the nozzle is alterable, the cleaning liquid can be injected all over inside the oil tank, so that the cleaning liquid can be avoided from failing to be injected over the sludge accumulated at corners of the oil tank, thereby providing a high cleaning effect.

BRIEF DESCRIPTION OF DRAWING(S)

FIG. 1 schematically shows a cleaning device of an oil tank according to an exemplary embodiment of the invention.

FIG. 2 schematically shows an entire heat exchanger.

DESCRIPTION OF EMBODIMENT(S)

Exemplary embodiment(s) of the invention will be described below with reference to the attached drawings.

Figure 1:
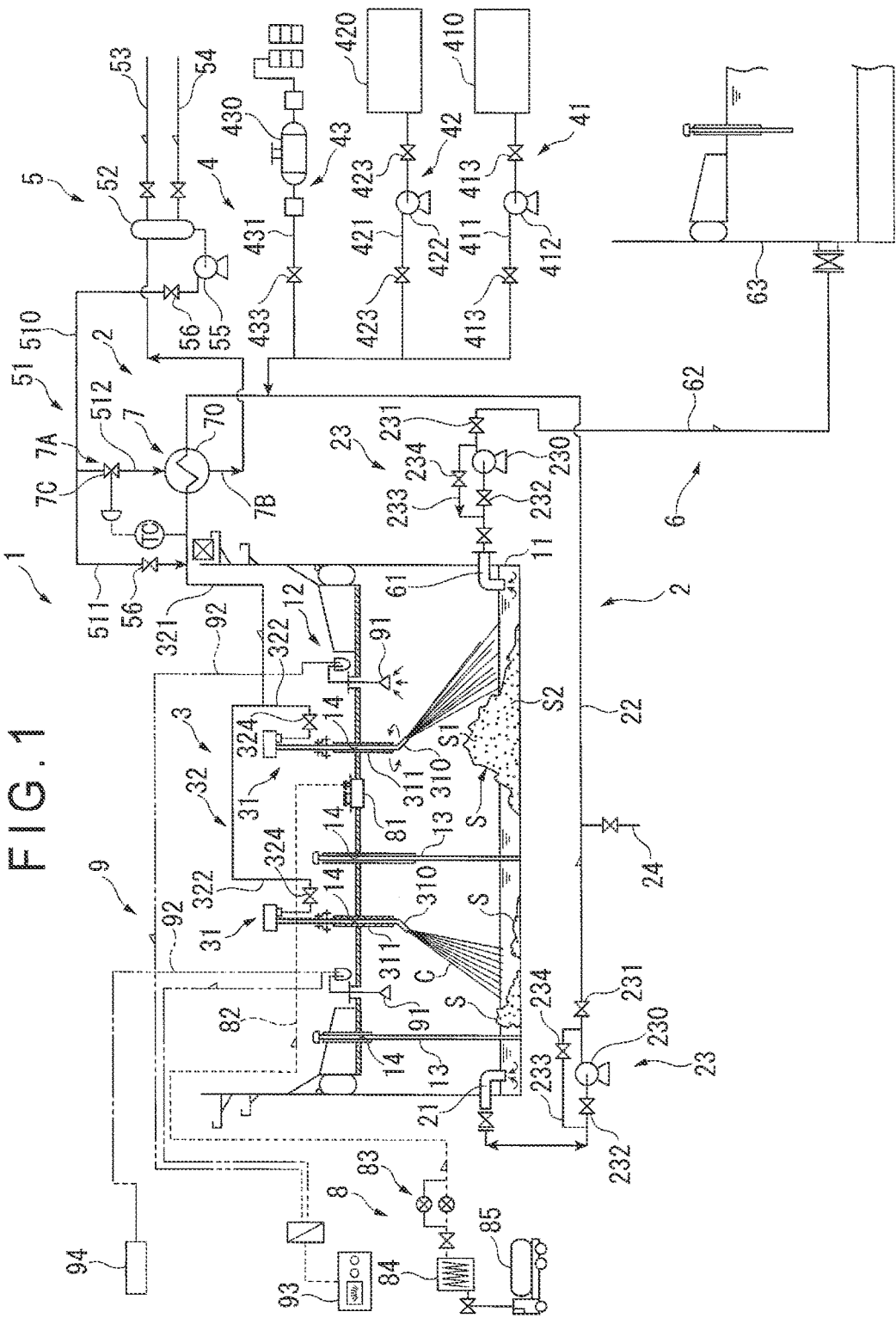

FIG. 1 schematically shows a cleaning device of an oil tank according to an exemplary embodiment of the invention.

As shown in FIG. 1, the cleaning device includes: a circulation line 2 with a first end connected to a lower portion of an oil tank 1; a cleaning liquid injection line 3 connected to a second end of the circulation line 2; a cleaning liquid feeding line 4 connected to the circulation line 2 in the middle thereof; a hot water feeding line 5 with a first end connected to the circulation line 2 in the middle thereof; a discharge line 6 provided to the lower portion of the oil tank 1; and a heat exchanger 7 provided to the circulation line 2.

The oil tank 1 includes: a tank body 11 in which crude oil is housed; a substantially disc-shaped roof 12 provided to the tank body 11; and a plurality of roof support pipes 13 that support the roof 12. Sludge S is accumulated on the bottom of the oil tank 1.

Herein, the sludge S contains a soft sludge S1 forming an upper layer and a hard sludge S2 forming a lower layer. The soft sludge S1 mainly contains wax. The hard sludge S2 contains deposited asphaltene. A pour point of the hard sludge S2 is higher than that of the soft sludge S1.

The crude oil means an unrefined mineral oil that is collected from an oil well in a form of a viscous liquid in reddish brown or blackish brown and contains hydrocarbons as a main component and a small amount of a compound containing organic sulfur, nitrogen or oxygen. The crude oil may be provided in a form of a blend of crude oils produced from various sources.

The plurality of roof support pipes 13 are disposed in a plurality of lines from the center of the roof 12 toward a periphery thereof. In each of the lines, ones of the plurality of roof support pipes 13 are equidistant from each other.

The roof 12 has a support opening 14 in a form of an existing opening, to which each of the roof support pipes 13 is attached, at a position corresponding to each of the roof support pipes 13. The roof 12 has a manhole (not shown) and the like formed in advance.

The roof 12 of the oil tank 1 is connected with a nitrogen feeding line 8 and an oxygen concentration detection line 9.

The nitrogen feeding line 8 includes: a nitrogen feeder 81 provided to the roof 12; a nitrogen feeding pipe 82 that feeds nitrogen to the nitrogen feeder 81; a flowmeter 83 and a carburetor 84 provided to the nitrogen feeding pipe 82; and a lorry 85 that feeds nitrogen to the nitrogen feeding pipe 82.

The oxygen concentration detection line 9 includes: a gas collection member 91 provided to the roof 12; a gas flow pipe 92 connected to the gas collection member 91; and an oxygen concentration detector 93 provided to the gas flow pipe 92. The gas collection member 91 is connected to a manometer 94.

The nitrogen feeding line 8 and the oxygen concentration detection line 9 are used for purging oxygen before a service worker works in the oil tank 1.

The circulation line 2 includes: a pipe 21 provided to a lower portion of the tank body 11 and having an open end; a main line pipe 22 having a first end connected to a base of the pipe 21 and a second end connected to the cleaning liquid injection line 3; and a flow path controller 23 provided to the main line pipe 22.

The pipe 21 is opened toward the bottom of the tank body 11 so as to suck fluid (e.g., a cleaning liquid) that is housed in the lower portion of the tank body 11 and in which the sludge S is dissolved.

A branch pipe 24 is provided to the main line pipe 22 between the flow path controller 23 and the heat exchanger 7. A recovery oil tank and a feedback tank (not shown) are connected to the branch pipe 24.

The flow path controller 23 includes: a pump 230 provided to the main line pipe 22; on-off valves 231 and 232 that are provided to the main line pipe 22 across the pump 230; a back-flow pipe 233 that has a first end connected to the main line pipe 22 between the pump 230 and the on-off valve 231 provided on a downstream side relative to the pump 230 and has a second end connected to the main line pipe 22 between the pump 230 and the on-off valve 232 provided on an upstream side relative to the pump 230; and an on-off valve 234 provided to the back-flow pipe 233. In order to direct the fluid flowing in the main line pipe 22 toward the cleaning liquid injection line 3 (i.e., in a forward flow direction) using the flow path controller 23, the flow path controller 23 is set in a forward flow mode in which the on-off valves 231 and 232 are opened and the on-off valve 234 is closed and subsequently the pump 230 is operated. In order to return the fluid flowing in the main line pipe 22 to the tank body 11 (i.e., in a back flow direction), the flow path controller 23 is set in a back flow mode in which the on-off valve 231 is closed and the on-off valves 232 and 234 are opened and subsequently the pump 230 is operated.

The cleaning liquid injection line 3 includes: an injector 31 that injects a cleaning liquid over the sludge S accumulated inside the oil tank 1; and a liquid flow pipe 32 that has an end connected to the injector 31.

The injector 31 is positioned correspondingly to the support opening 14. Two injectors 31 are shown in FIG. 1.

The injector 31 includes: a nozzle 310 that is inserted into the support opening 14 and injects the cleaning liquid from an end of the nozzle 310; and an air motor (not shown) that rotates the nozzle 310. The rotation of the air motor allows an injection posture of the end of the nozzle 310 to be altered.

The nozzle 310 includes a cylindrical body with the bendable end, through which the cleaning liquid is fed. The body is attached to the support opening 14 by a cylindrical guide 311.

The liquid flow pipe 32 includes: a main flow pipe 321 having a first end connected to the main line pipe 22 of the circulation line 2; and a branch pipe 322 that is branched from a second end of the main flow pipe 321 and connected to a base of the nozzle 310 of each of the injectors 31.

The cleaning liquid flowing inside the liquid flow pipe 32 is set using the heat exchanger 7 so that a temperature of the cleaning liquid injected from the nozzle 310 is in a range from 30 degrees C. to 50 degrees C. When the temperature of the cleaning liquid exceeds 50 degrees C., low-boiling-point hydrocarbons contained in the sludge become gas to be released in the air, which may cause troubles. When the temperature of the cleaning liquid exceeds 60 degrees C., a component of a part of the sludge adheres on a heat transmission surface. Accordingly, it is important that the temperature of the cleaning liquid is not excessively increased. In contrast, when the temperature of the cleaning liquid is less than 30 degrees C., sufficient cleaning effects cannot be obtained. Accordingly, in order to prevent an excessive increase in the temperature of the heat transmission surface, it is preferable to control the temperature of the cleaning liquid in a range from 30 degrees C. to 50 degrees C. by heating the cleaning liquid with hot water.

The cleaning liquid feeding line 4 includes: an LCO feeding line 41 that feeds LCO (Light Cycle Oil); a CLO feeding line 42 that feeds clarified oil (CLO); and a chemical agent feeding unit 43 that feeds a chemical agent.

The LCO feeding line 41 includes: a first tank 410 that houses LCO; a connecting pipe 411 that connects the first tank 410 to the main line pipe 22; and a pump 412 and an on-off valve 413 which are provided to the connecting pipe 411.

The CLO feeding line 42 includes: a second tank 420 that houses the CLO; a connecting pipe 421 that connects the second tank 420 to the main line pipe 22; and a pump 422 and an on-off valve 423 which are provided to the connecting pipe 421.

The chemical agent feeding unit 43 includes: a chemical agent housing tank 430 that houses a chemical agent; a connecting pipe 431 that connects the chemical agent housing tank 430 to the main line pipe 22; and a pump (not shown) and an on-off valve 433 which are provided to the connecting pipe 431.

The chemical agent housed in the chemical agent housing tank 430 contains a surfactant and limonene.

The surfactant is one selected from an anionic surfactant, cationic surfactant, zwitterionic surfactant and nonionic surfactant.

Examples of the anionic surfactant are carboxylate, sulfonate, sulfate and phosphate.

Examples of the carboxylate are ethanol amine soap, N-acylamino acid and alkyl ether carboxylic acid. Examples of the sulfonate are alkylbenzene sulfonate, alkylnaphthalene sulfonate, melamine sulfonate, dialkyl sulfosuccinate, alkyl sulfoacetate, and α-olefin sulfonate. Examples of the sulfate are sulfonated oil, higher alcohol sulfate, alkyl ether sulfate, secondary higher alcohol ethoxy sulfate, polyoxyethylene alkylphenyl ether sulfate, and sulfate of fatty acid alkylolamide. Examples of the phosphate are alkyl ether phosphate and alkyl phosphate.

The cationic surfactant is exemplified by aliphatic amine such as aliphatic quaternary amine.

Examples of the zwitterionic surfactant are carboxy betaine, sulfo-betaine, amino carboxylate and an imidazoline derivative.

Examples of the nonionic surfactant are an ether surfactant, ether ester surfactant, ester surfactant and nitrogen-containing surfactant.

Examples of the ether surfactant are polyoxyethylene alkyl ether, polyoxyethylene alcohol ether, and polyoxyethylene alkyl phenyl ether. The ether ester surfactant is exemplified by polyoxyethylene sorbitol aliphatic ester. The ester surfactant is exemplified by polyoxyethylene glycol aliphatic ester.

Examples of the nitrogen-containing nonionic surfactant are fatty acid alkanolamide and polyoxyethylene fatty acid amide.

Limonene may be optical isomers d and l. Examples of the d-limonene include its derivatives, examples of which include citral A. The limonene may be dipentene.

Examples of the chemical agent further include substances other than the surfactant and limonene, such as β-bilene and monoterpane.

The cleaning liquid in the exemplary embodiment is provided by a cleaning liquid containing only LCO, a cleaning liquid containing LCO and the crude oil housed in the tank body 11 before cleaning the tank, or a cleaning liquid containing LCO, CLO and the chemical agent. An appropriate ratio of LCO, CLO and the chemical agent forming the cleaning liquid is achieved by a controller (not shown) controlling to open and close the on-off valves 413, 423 and 433 and the pumps 412 and 422. The crude oil used as the cleaning liquid may be fed from the outside through a crude oil feeding line (not shown) in addition to the crude oil housed in advance in the tank body 11.

An amount of the crude oil used as the cleaning liquid is a value obtained by subtracting an amount of the crude oil discharged from the oil tank 1 just before cleaning the oil tank 1 from an amount of the crude oil stored in the oil tank 1. Since the crude oil is used for the cleaning liquid, the amount of the crude oil necessary for the cleaning needs to be securely kept when discharging the crude oil before the cleaning. When the amount of the crude oil left in the oil tank 1 in advance is little, the necessary amount of the crude oil is fed from the outside into the oil tank 1 as described above.

The cleaning liquid includes: a soft sludge cleaning liquid for dissolving the soft sludge S1; and a hard sludge cleaning liquid for dissolving the hard sludge S2 after dissolving the soft sludge S1 using the soft sludge cleaning liquid.

The soft sludge cleaning liquid contains only LCO or both of LCO and the crude oil. An amount of LCO is in a range from 0.1 times to 0.5 times and the amount of the crude oil is in a range from 3.0 times to 4.0 times relative to a total amount of the sludge S accumulated in the tank body 11. Although it is preferable that the crude oil housed in advance in the oil tank 1 is used as the crude oil used for the soft sludge cleaning liquid, a crude oil separately prepared may be used.

The hard sludge cleaning liquid is provided by a cleaning liquid containing only LCO, a cleaning liquid containing LCO and the crude oil, a cleaning liquid containing LCO, the crude oil and the chemical agent, and a cleaning liquid containing LCO, the crude oil, CLO and the chemical agent.

The hard sludge cleaning liquid contains the amount of LCO in 1.0 time to 4.0 times relative to an amount of the hard sludge S2 accumulated in the oil tank 1 after the soft sludge S1 is dissolved. When the hard sludge cleaning liquid contains the crude oil, the amount of the crude oil is 0.5 times or less relative to the amount of the hard sludge S2. When the amount of LCO is less than 1.0 time, the cleaning liquid containing the hard sludge becomes highly viscous to lose fluidity. In consideration of the fluidity, the fluidity is more favorable when the amount of LCO is higher. However, when the amount of LCO is excessively high, separation of LCO from the sludge, which is later conducted, requires much energy. Accordingly, the amount of LCO is 5 times or less in terms of economical reasons. It is preferable that the crude oil housed in advance in the oil tank 1 is used as the crude oil used for the hard sludge cleaning liquid.

A ratio of the chemical agent in the total hard sludge cleaning liquid is in a range from 0.2 mass % to 1.0 mass %, preferably in a range from 0.2 mass % to 0.5 mass %. When the ratio of the chemical agent is less than 0.2 mass %, sufficient cleaning effects cannot be obtained. When the ratio of the chemical agent exceeds 1.0 mass %, an excessively large cost is required although a cleaning performance is only slightly improved.

A ratio of the limonene to the total chemical agent is in a range from 20 mass % to 40 mass %. When the ratio of the limonene is less than 20 mass %, a dissolving power of the chemical agent to the sludge is insufficient. When the ratio of the limonene exceeds 40 mass %, a dispersion power of the chemical agent to the sludge is weakened.

The hot water feeding line 5 includes: a hot water feeding pipe 51 having a first end that is opened toward the main line pipe 22; a hot water tank 52 connected to a second end of the hot water feeding pipe 51; a water-feeding pipe 53 that feeds industrial water to the hot water tank 52; a steam feeding pipe 54 that feeds steam to the hot water tank 52; and a pump 55 that feeds a hot water housed in the hot water tank 52 to the cleaning liquid injection line 3.

The hot water feeding pipe 51 includes: a feeding pipe body 510; and a first branch pipe 511 and a second branch pipe 512 which are connected to an end of the feeding pipe body 510. Each of the feeding pipe body 510 and the first branch pipe 511 is provided with an on-off valve 56.

The discharge line 6 includes: a pipe 61 provided to the lower portion of the tank body 11 and having an open end; a main line pipe 62 having a first end connected to a base of the pipe 61; a slop tank 63 provided at a second end of the main line pipe 62; and a flow path controller 23 connected to the main line pipe 62 in the middle thereof.

Similar to the pipe 21, the pipe 61 is opened toward the bottom of the tank body 11 so as to suck fluid (e.g., a cleaning liquid) that is housed in the lower portion of the tank body 11 and in which the crude oil and the sludge S are dissolved.

The slop tank 63 stores waste fluid of the recovered crude oil and has the same structure as that of a typical tank.

The flow path controller 23 includes a pump 230 provided to the main line pipe 62, on-off valves 231 and 232 that are provided to the main line pipe 62 across the pump 230, a back-flow pipe 233 that has a first end connected to the main line pipe 62 between the pump 230 and the on-off valve 231 provided on a downstream side relative to the pump 230 and has a second end connected to the main line pipe 62 between the pump 230 and the on-off valve 232 provided on an upstream side relative to the pump 230, and an on-off valve 234 provided to the back-flow pipe 233.

The heat exchanger 7 heats the cleaning liquid fed from the cleaning liquid feeding line 4 and the cleaning liquid fed from the tank body 11 in which the sludge S is dissolved using the hot water prepared by the hot water feeding line 5. Simultaneously, the heat exchanger 7 separates aggregation of the sludge S. The heat exchanger 7 includes: an exchanger body 70; a feeding pipe 7A that feeds the hot water from the hot water feeding pipe 51 to the exchanger body 70; and a discharge pipe 7B that discharges the hot water from the exchanger body 70 to the hot water tank 52.

An end of the feeding pipe 7A is connected to the second branch pipe 512 of the hot water feeding pipe 51. An on-off valve 7C is provided to the feeding pipe 7A in the middle thereof. When the temperature of the cleaning liquid flowing through the main line pipe 22 reaches a predetermined temperature, the on-off valve 7C is controlled to be opened or closed.

Figure 2:
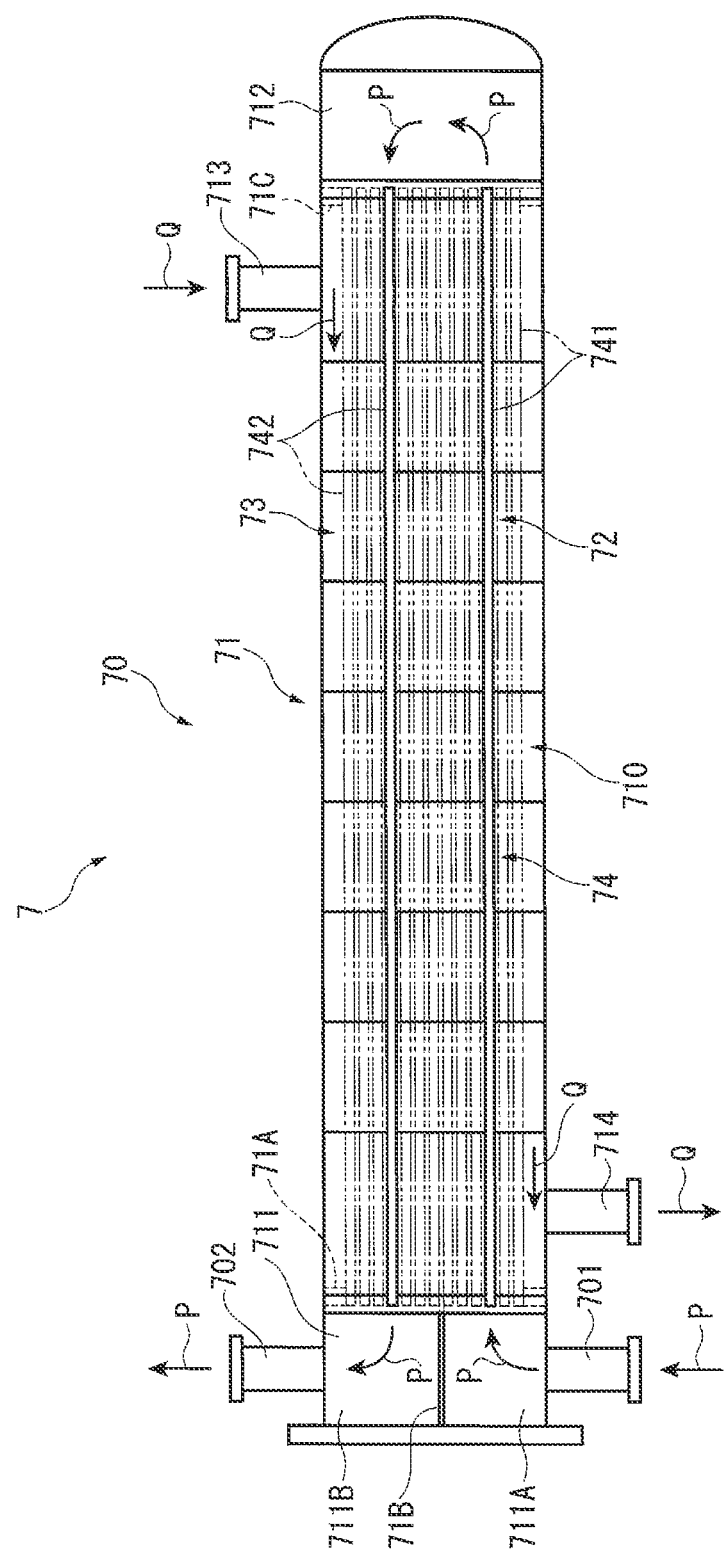
Figure 3:
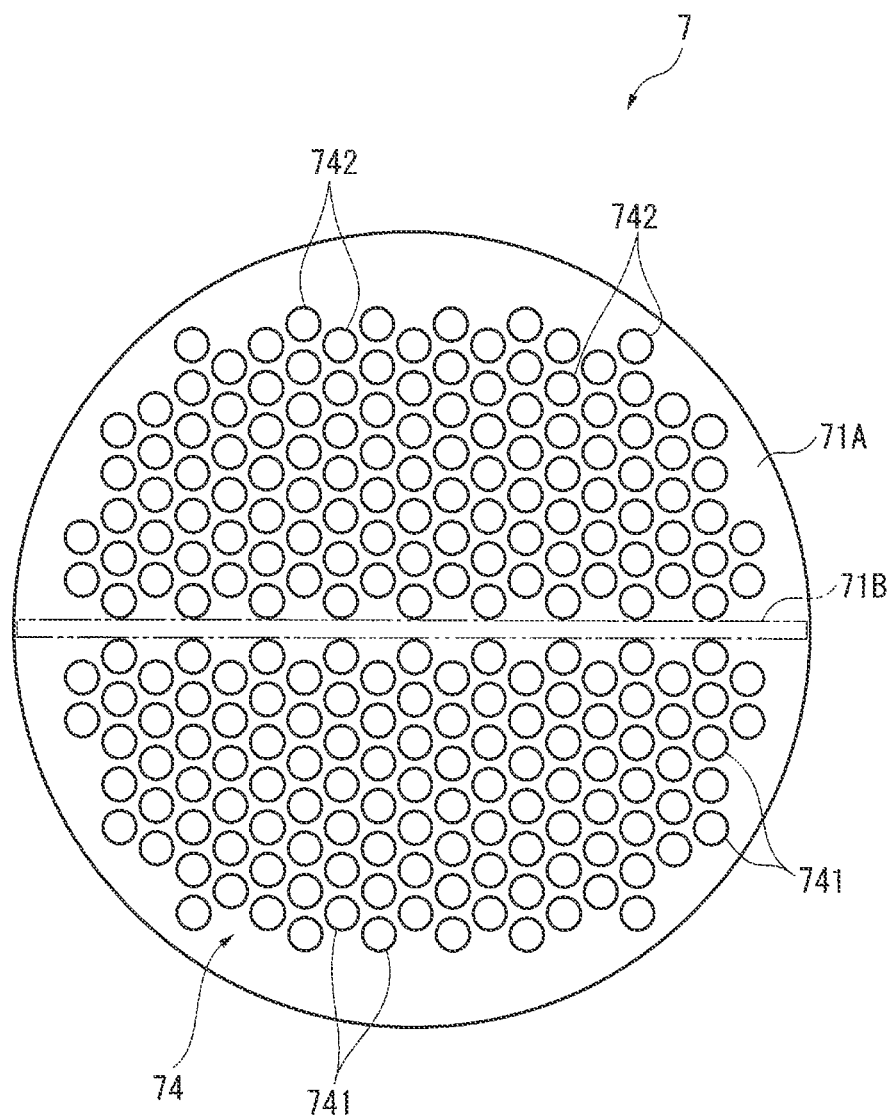
FIG. 3 shows an end surface of a tube of the heat exchanger.
Figure 4:
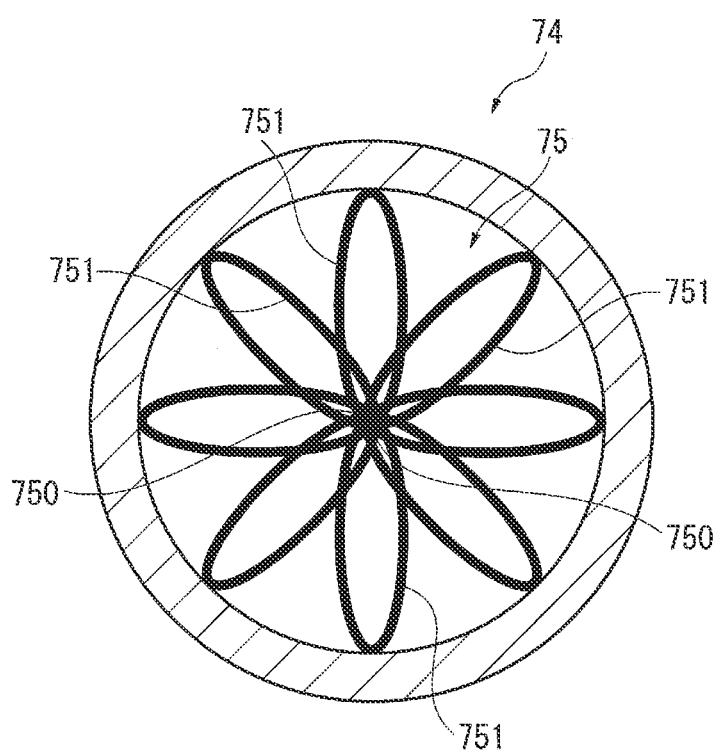
FIG. 4 is an enlarged cross-sectional view of a relevant part of the heat exchanger.

A specific structure of the heat exchanger 7 is shown in FIGS. 2 to 4.

An entire structure of the exchanger body 70 is shown in FIGS. 2 and 3.

As shown in FIGS. 2 and 3, the exchanger body 70 includes: a casing 71 in a form of a cylinder with both ends closed; and a fluid flow section 72 and a hot water flow section 73 which are provided inside the casing 71.

An inside of the casing 71 is divided into three chambers in an axial direction. A central chamber of the three chambers is a heat exchange chamber 710 for heat exchange between the fluid flow section 72 and the hot water flow section 73.

The rest two chambers in the casing 71 are a first flow chamber 711 and a second flow chamber 712.

A size of the exchanger body 70 is determined according to a size of the oil tank 1 and other conditions. For instance, the heat exchange chamber 710 has 3.0 m of an axial length and 0.6 m of an inner diameter.

The central chamber of the casing 71 may be formed by bonding a plurality of cylinders (see FIG. 2) or may be formed by a single cylinder.

The first flow chamber 711 and the heat exchange chamber 710 are separated from each other by a partition wall 71A provided inside the casing 71. A partition wall 71B is disposed to be orthogonal to a plane of the partition wall 71A. The first flow chamber 711 is divided by the partition wall 71B into an introduction chamber 711A and a discharge chamber 711B.

The introduction chamber 711A communicates with a fluid introduction pipe 701 provided on a circumferential surface of a first end of the casing 71. The discharge chamber 711B communicates with a fluid discharge pipe 702 provided opposite to the fluid introduction pipe 701 on the casing 71.

The fluid introduction pipe 701 introduces the cleaning liquid fed from the oil tank 1 into the introduction chamber 711A. The fluid discharge pipe 702 discharges the cleaning liquid from the discharge chamber 711B to the cleaning liquid injection line 3.

The second flow chamber 712 and the heat exchange chamber 710 are separated from each other by a partition wall 71C provided to the casing 71.

The fluid flow section 72 includes: the first flow chamber 711; the second flow chamber 712; and a plurality of tubes 74 disposed in the heat exchange chamber 710.

For instance, each of the tubes 74 is a straight pipe made of stainless steel and having an inner diameter of 25.4 mm, in which both first and second ends are supported by the partition walls 71A and 71C. The first end of each of the tubes 74 is opened toward the second flow chamber 712. The plurality of tubes 74 include: a plurality of first pipe members 741 disposed below an imaginary plane continuous to a plane of the partition wall 71B in the drawing; and a plurality of second pipe members 742 disposed above the imaginary plane in the drawing.

The second end of each of the first pipe members 741 is opened to the introduction chamber 711A. The second end of each of the second pipe members 742 is opened toward the discharge chamber 711B. In other words, the cleaning liquid introduced from the fluid introduction pipe 701 passes through the introduction chamber 711A in the first flow chamber 711, the first pipe members 741, the second flow chamber 712, the second pipe members 742, the discharge chamber 711B and the fluid discharge pipe 702 to be fed to the cleaning liquid injection line 3 (see an arrow P in FIG. 2).

It should be noted that the plurality of tubes 74 may be supported by a partition wall (not shown) in the middle thereof.

The hot water flow section 73 is a space defined by an inner circumference of the casing 71 and outer circumferences of the plurality of tubes 74 in the heat exchange chamber 710.

A hot water introduction pipe 713 is provided near the second flow chamber 712 on the outer circumference of the casing 71. A hot water discharge pipe 714 is provided near the first flow chamber 711 on the outer circumference of the casing 71.

Each of the hot water introduction pipe 713 and the hot water discharge pipe 714 communicates with the heat exchange chamber 710. The hot water introduced from the hot water introduction pipe 713 passes through the heat exchange chamber 710 and subsequently passes through the hot water discharge pipe 714 to return to the hot water tank 52 (see arrows Q in FIG. 2). It should be noted that a baffle (not shown) is disposed near an opening of the hot water introduction pipe 713 of the hot water flow section 73. A flow rate of the hot water introduced from the hot water introduction pipe 713 is decreased by the baffle.

A specific structure of the tube 74 is shown in FIG. 4.

As shown in FIG. 4, an aggregation separation device 75 that separates aggregations of the sludge S dissolved in the cleaning liquid is provided inside the tube 74.

When the sludge S is dissolved in the cleaning liquid injected from the nozzle 310 inside the oil tank 1, the aggregations forming the sludge S repel each other to be separated, but are occasionally recombined by intermolecular force and the like while being transferred through the circulation line 2. Accordingly, in the exemplary embodiment, the aggregation separation device 75 is provided in the tube 74 in order to again separate the mutually combined aggregations by a mechanical force.

The aggregation separation device 75 made of a stainless steel includes: an axis core 750 disposed in a length direction of the tube 74; and a plurality of loops 751 integrated with a circumference of the axis core 750. The loops 751 partially overlap with each other near the axis core 750.

The loops 751 may be provided at a plurality of positions in an axial direction of the axis core 750, or may be provided only at single position. The loops 751 may be formed by bending a wire or a plate. Moreover, in order to easily separate the mutually combined aggregations, positions of the loops 751 in a plane orthogonal to the axial direction may be shifted along a circumferential direction of the tube 74. Further, the number of the loops 751 is not limited.

When the sludge S dissolved in the cleaning liquid flows through inside the tube 74, the mutually recombined aggregations of the sludge S collide with the loops 751 to be fed to the nozzle 310 in a separated state.

Next, a method of cleaning the oil tank will be described with reference to FIGS. 5A to 5F.

Crude Oil Discharge Step

Figure 5A:
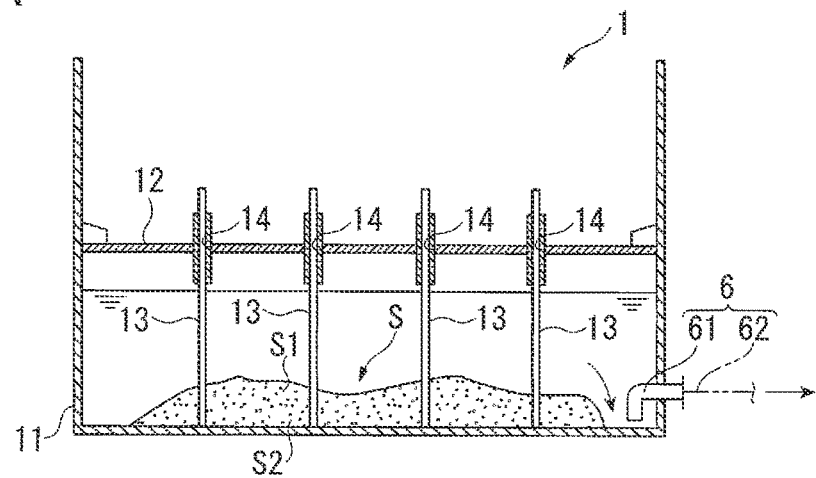
FIG. 5A is a schematic illustration showing a cleaning method of an oil tank according to an exemplary embodiment of the invention.

As shown in FIGS. 1 and 5A, firstly, the flow path controller 23 of the discharge line 6 is set in a forward flow mode. A crude oil housed inside the oil tank 1 is fed through the pipe 61 and the main line pipe 62 to the slop tank 63.

All the crude oil is removed from the oil tank 1. However, the crude oil left in the oil tank 1 may be used as a cleaning liquid. When an amount of the crude oil includes an amount thereof to be used as the cleaning liquid, a discharge amount of the crude oil is determined so that the amount of the crude oil left in the oil tank 1 is in a range of 3.0 times to 4.0 times relative to an amount of the sludge S. Since an accurate amount of the sludge S is measured in a sludge measurement step conducted later, at this time, an accumulated amount of the sludge S is estimated based on experiences. The crude oil is discharged so as to leave the amount of the crude oil in a range of 3.0 times to 4.0 times relative to the estimated amount of the sludge S.

It should be noted that the roof 12 is supported by all the roof support pipes 13 at the time of completing the discharge of the crude oil.

Moreover, the nitrogen feeding line 8 and the oxygen concentration detection line 9 are used to purge oxygen in the oil tank 1.

Preparation Step

1. Sludge Measurement Step

After stopping the discharge line 6, a total amount of the sludge S accumulated inside the oil tank 1 is measured.

Figure 5B:
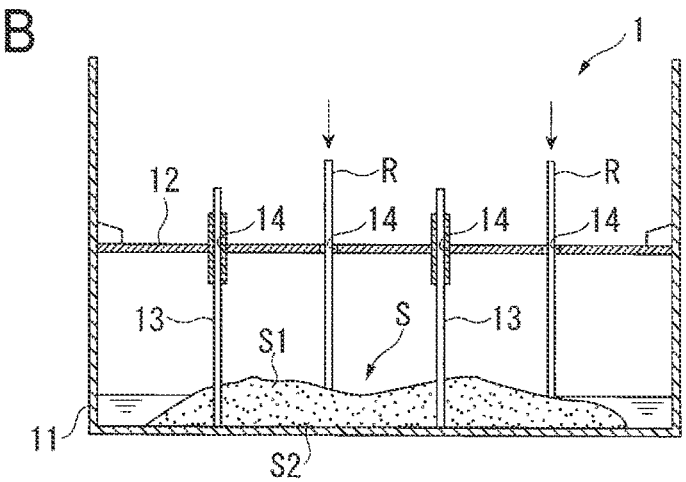
FIG. 5B is another schematic illustration showing the cleaning method of the oil tank according to then exemplary embodiment of the invention.
Figure 5C:
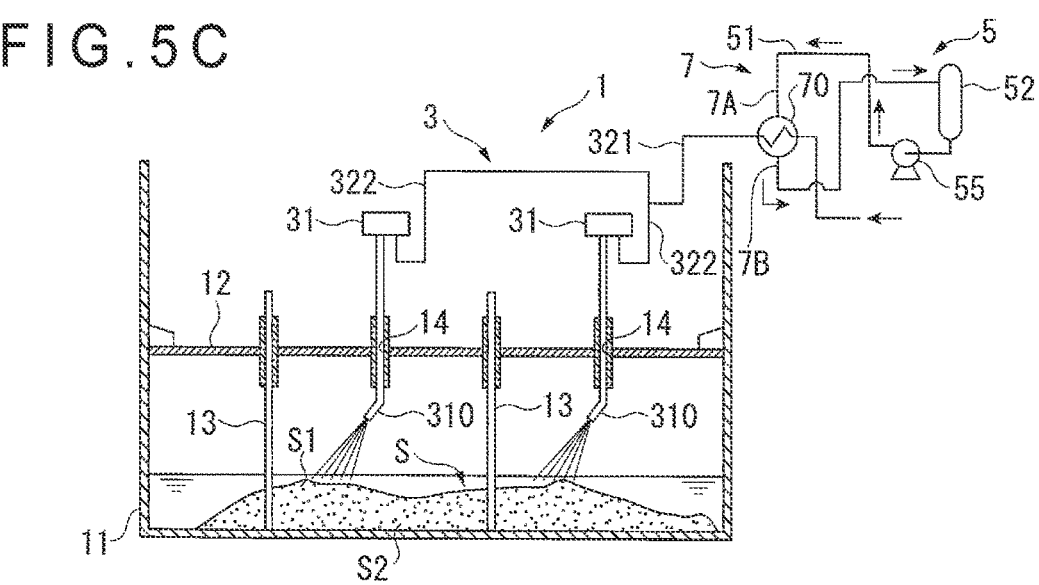
FIG. 5C is still another schematic illustration showing the cleaning method of the oil tank according to the exemplary embodiment of the invention.

As shown in FIG. 5B, all or some of the plurality of roof support pipes 13 are removed and the measuring rod R is inserted toward the bottom of the oil tank 1 through each of the support openings 14 created after removing the roof support pipes 13. With this operation, a dimension from the roof 12 to a top of the accumulated sludge S can be measured.

Since a dimension from a lower surface of the roof 12 to the bottom of the tank body 11 is previously known, a height of the accumulated sludge S can be measured based on a dimension from a lower end of the measuring rod R to the lower surface of the roof 12. In the exemplary embodiment, the measurement using the measuring rod R is conducted in a plurality of lines and a plurality positions of each of the plurality of lines from the center of the roof 12 to a periphery thereof, so that the total amount of the sludge S accumulated in a predetermined area on the bottom of the tank body 11 can be estimated.

When the cleaning liquid contains the crude oil, and when the amount of the crude oil housed in the oil tank 1 relative to the total amount of the sludge S exceeds 4.0 times, only a necessary amount of the crude oil is discharged from the oil tank 1 in the above-described procedure. In contrast, when the amount of the crude oil relative to the total amount of the sludge S is less than 3.0 times, the necessary amount of the crude oil is taken from the discharged and stored crude oil to be fed into the oil tank 1. Although it is preferable that the crude oil housed in the oil tank 1 is used for feeding, if no crude oil is left in the oil tank 1, a crude oil separately prepared may be used.

2. Nozzle Insertion Step

As shown in 5C, the injector 31 is provided to the roof 12. It should be noted that the injector 31 may be provided before the sludge measurement step.

In order to provide the injector 31, the nozzle 310 of the injector 31 is inserted into the support opening 14 created by removing the measuring rod R. The nozzle 310 may be inserted in all the openings after removing the measuring rods R or may be inserted in some of the openings. When the measuring rods R are inserted in some of the openings, the roof support pipe 13 may be provided to the support opening 14 according to the need.

Soft Sludge Cleaning Step

1. Cleaning Liquid Injection Step

The cleaning liquid is injected from the nozzle 310 toward the sludge S accumulated inside the oil tank 1. In order to do so, the cleaning liquid formed of LCO is fed to the circulation line 2 by operating the cleaning liquid feeding line 4.

The cleaning liquid passes through the circulation line 2 and the heat exchanger 7 and is injected from the nozzle 310 of the cleaning liquid injection line 3 to be fed over the sludge S. Herein, since the crude oil is left in the oil tank 1, a soft sludge cleaning liquid contains the crude oil. It should be noted that, when all the crude oil is discharged, the discharged crude oil is used for the soft sludge cleaning liquid.

The soft sludge cleaning liquid injected from the nozzle 310 collides by a predetermined pressure with the sludge S, particularly, the soft sludge S1 in the upper layer of the sludge S, so that the soft sludge S1 is dissolved. Further, since a posture of each of a plurality of nozzles 310 for injecting the cleaning liquid is altered as needed by the air motor, the soft sludge cleaning liquid is spread all over inside the oil tank 1.

The heat exchanger 7 is connected to the hot water feeding line 5. When the pump 55 is activated, the hot water stored in advance in the hot water tank 52 of the hot water feeding line 5 flows through the hot water feeding pipe 51, the feeding pipe 7A, the exchanger body 70 and the discharge pipe 7B to return to the hot water tank 52. Accordingly, the soft sludge cleaning liquid to be injected from the nozzle 310 is kept at the temperature of about 40 degrees C.

Herein, since the injection amount per unit time of the injector 31 is known, the number of the injector 31 is known, and the amount of the soft sludge cleaning liquid injected over the sludge S is measured in the sludge measurement step, a predetermined amount of the cleaning liquid can be injected by setting the injection time of the cleaning liquid.

The cleaning liquid injection step ends when the predetermined amount of the soft sludge cleaning liquid is injected.

2. Circulation Step

Figure 5D:
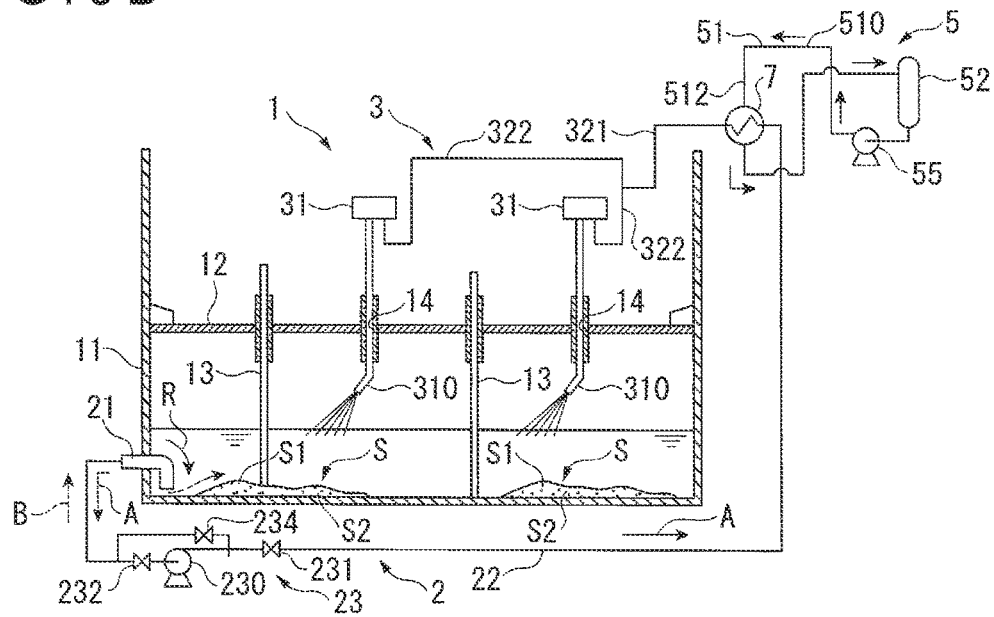
FIG. 5D is a further schematic illustration showing the cleaning method of the oil tank according to the exemplary embodiment of the invention.

As shown in FIGS. 1 and 5D, after the cleaning liquid injection step ends, the soft sludge cleaning liquid in which the soft sludge is dissolved is discharged from the oil tank 1 and is returned to the oil tank 1.

In order to do so, the cleaning liquid feeding line 4 is operated to stop feeding the fluid formed of LCO to the circulation line 2.

The flow path controller 23 of the circulation line 2 is set in the forward flow mode. The soft sludge cleaning liquid in which the soft sludge is dissolved is fed through the pipe 21, the circulation line 2 and the heat exchanger 7 to the injector 31 (see an arrow A in FIG. 5D).

By the operation of the flow path controller 23, the soft sludge cleaning liquid together with the soft sludge flows through the circulation line 2 and the heat exchanger 7 to be fed to the injector 31 and injected over the sludge S accumulated on the bottom of the oil tank 1 from the nozzle 310 of the injector 31. With this operation, the soft sludge S1 left undissolved after the fluid injection in the cleaning liquid injection step is dissolved. Similar to in the soft sludge injection step, the fluid injected from the nozzle 310 is kept at the temperature of about 40 degrees C. by the heat exchanger 7.

In the circulation step, the cleaning liquid in which the sludge S is dissolved passes through the tubes 74 of the heat exchanger 7. The aggregations of the soft sludge S1 are separated from each other by the aggregation separation device 75 provided inside each of the tubes 74, so that the soft sludge cleaning liquid and the soft sludge S1 are fed to the tank body 11 while being turbulently stirred.

In the exemplary embodiment, after the operation in the forward flow mode in the flow path controller 23 is conducted for a predetermined time, the flow path controller 23 is switched to a back flow mode. With this operation, the soft sludge cleaning liquid in which the soft sludge stored in the circulation line 2 is dissolved is injected back from the pipe 21 toward the bottom of the tank body 11 (see an arrow B in FIG. 5D), thereby stirring the soft sludge S1 accumulated in the tank body 11. It should be noted that, in the exemplary embodiment, the crude oil may be injected back over the sludge S accumulated inside the tank body 11 by setting the flow path controller 23 of the discharge line 6 in the forward flow mode, in addition to the circulation line 2 or in place of the circulation line 2.

The circulation step ends after the above step is conducted for a predetermined time. The forward flow mode and the back flow mode by the flow path controller 23 may be repeated.

Soft Sludge Discharge Step

1. Sludge Discharge

After the soft sludge circulation step ends, the operation of the circulation line 2 is stopped and the flow path controller 23 of the discharge line 6 is set in the forward flow mode. Accordingly, the soft sludge cleaning liquid in which the soft sludge S1 is dissolved and which is stored in the tank body 11 is fed through the pipe 61 and the main line pipe 62 to the slop tank 63.

After the elapse of the predetermined time, when the soft sludge cleaning liquid in which the soft sludge S1 is dissolved is completely discharged from the oil tank 1, the sludge S left on the bottom of the oil tank 1 is the hard sludge S2.

2. Sludge Measurement Step

Figure 5E:
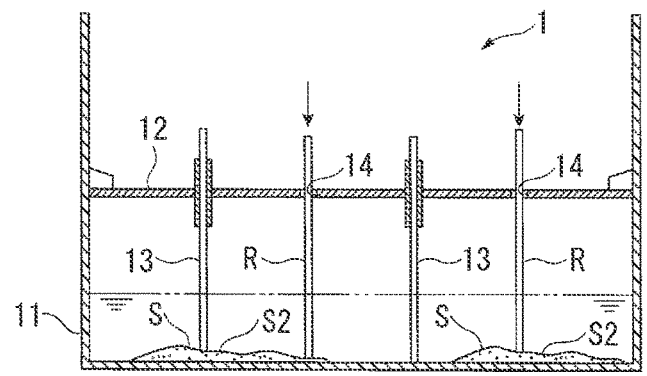
FIG. 5E is a still further schematic illustration describing the cleaning method of the oil tank according to the exemplary embodiment of the invention.

As shown in FIG. 5E, an amount of the hard sludge S2 adhering inside the oil tank 1 is measured. In order to do so, all the injectors 31 or some of the injectors 31 are removed from the roof 12. The measuring rod R is inserted toward the bottom of the oil tank 1 through each of the support openings 14 created after removing the nozzles 310 of the injectors 31. The amount of the hard sludge S2 adhering on the bottom of the oil tank 1 is measured in the same manner as the above.

Hard Sludge Cleaning Step

1. Cleaning Liquid Injection Step

The hard sludge cleaning liquid is injected from the nozzles 310 toward the hard sludge S2 accumulated inside the oil tank 1. In order to do so, a liquid containing LCO only, a liquid containing LCO and the chemical agent or a liquid containing LCO, CLO and the chemical agent is fed as the hard sludge cleaning liquid to the circulation line 2 by operating the cleaning liquid feeding line 4.

The hard sludge cleaning liquid passes through the circulation line 2 and the heat exchanger 7 and is injected from the nozzles 310 of the cleaning liquid injection line 3 to collide with the hard sludge S2.

Since the hard sludge cleaning liquid injected from the nozzles 310 collides with the hard sludge S2 by a predetermined pressure, the hard sludge S2 is dissolved. Similar to in the soft sludge injection step, the fluid injected from the nozzle 310 is kept at the temperature of about 40 degrees C. by the heat exchanger 7.

2. Circulation Step

As shown in FIGS. 1 and 5D, the hard sludge cleaning liquid in which the hard sludge S2 is dissolved is discharged from the oil tank 1 and is returned to the oil tank 1.

In order to do so, in the same manner as in the soft sludge cleaning step, the cleaning liquid feeding line 4 is operated to stop feeding the hard sludge cleaning liquid to the circulation line 2.

The flow path controller 23 of the circulation line 2 is set in the forward flow mode. The hard sludge cleaning liquid in which the hard sludge S2 is dissolved is fed through the pipe 21, the circulation line 2 and the heat exchanger 7 to the injector 31 (see the arrows A in FIG. 5D).

With this operation, the soft sludge S1 left undissolved after the fluid injection in the cleaning liquid injection step is to be dissolved.

In the hard sludge cleaning step, at the circulation step, the hard sludge cleaning liquid in which the hard sludge S2 is dissolved also passes through the tubes 74 of the heat exchanger 7. The aggregations of the hard sludge S2 are separated from each other by the aggregation separation device 75 provided inside each of the tubes 74, so that the hard sludge cleaning liquid and the hard sludge S2 are fed to the tank body 11 while being turbulently stirred.

The circulation step ends when the above step is conducted for a predetermined time. The forward flow mode and the back flow mode by the flow path controller 23 are repeated.

Hard Sludge Discharge Step

1. Sludge Measurement Step

As shown in FIG. 5E, after the hard sludge circulation step ends, the amount of the sludge S adhering inside the oil tank 1 is measured to check whether the sludge S is accumulated on the bottom of the oil tank 1.

When the amount of the sludge S is at a predetermined value or less, it is confirmed that no sludge is accumulated in the oil tank 1.

2. Sludge Discharge

Figure 5F:
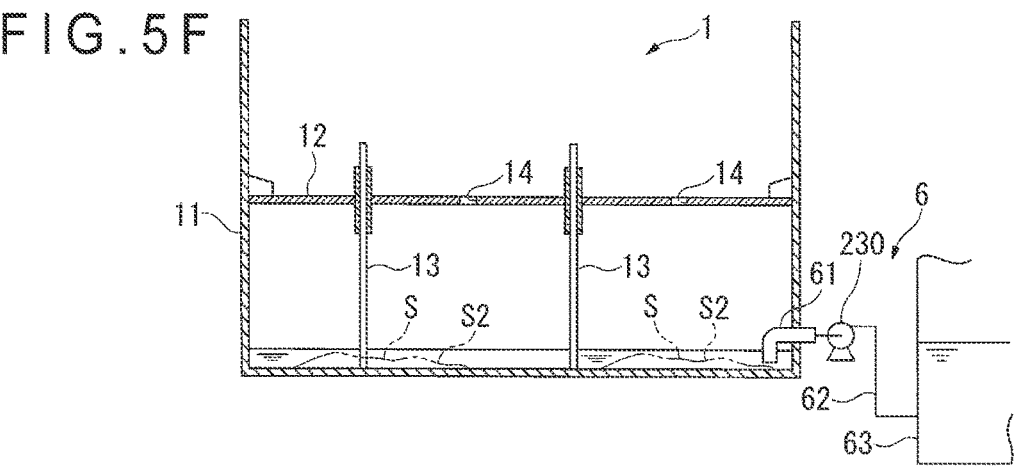
FIG. 5F is a still further schematic illustration showing the cleaning method of the oil tank according to the exemplary embodiment of the invention.

As shown in FIG. 5F, after confirming that no sludge S adheres on the bottom of the oil tank 1, the hard sludge cleaning liquid in which the hard sludge S2 is dissolved is fed through the pipe 61 and the main line pipe 62 to the slop tank 63 in the same procedure as in the soft sludge discharge step.

3. Hot Water Cleaning Step

After the fluid in which the sludge S is dissolved is discharged from the oil tank 1, hot water is fed into the oil tank 1 to conduct hot water cleaning. In order to do so, as shown in FIG. 1, the on-off valve 56 provided to the first branch pipe 511 of the hot water feeding pipe 51 is opened to inject hot water stored in the hot water tank 52 from the nozzle 310 of the cleaning liquid injection line 3 toward the tank body 11.

According to the exemplary embodiment, the following advantages can be obtained.

(1) The crude oil is discharged from the oil tank 1. The nozzle 310 is inserted into the support opening 14 formed in advance on the roof 12 of the oil tank 1. The cleaning liquid containing LCO is injected from the nozzle 310 over the sludge S accumulated inside the oil tank 1. The cleaning liquid in which the sludge S is dissolved is discharged from the oil tank 1 and returned to the oil tank 1 for recycle cleaning. The cleaning liquid in which the sludge S is dissolved is discharged from the oil tank 1. Accordingly, since the cleaning liquid contains LCO, a cleaning effect is high. Moreover, since the support opening 14 formed in advance on the roof 12 is used for feeding the cleaning liquid inside the oil tank 1, a cleaning operation in this arrangement is easier than that in an arrangement with a cleaning device and a stirrer inside the oil tank 1, so that a cleaning cost can be reduced.

(2) Since the sludge S includes the soft sludge S1 forming the upper layer and the hard sludge S2 forming the lower layer having mutually different components, two types of a soft sludge cleaning liquid and a hard sludge cleaning liquid are prepared as the cleaning liquid. Since the hard sludge S2 contains asphaltene, the hard sludge cleaning liquid is adapted to contain LCO and a chemical agent added with a surfactant and limonene. Since the soft sludge S1 contains less asphaltene and does not necessarily require a chemical agent, the soft sludge cleaning liquid is adapted to contain no chemical agent, so that a cost for discharging the sludge is reduced.

(3) The hard sludge cleaning liquid contains the amount of LCO at 1.0 time or more relative to the amount of the hard sludge S2 accumulated in the oil tank 1, so that the hard sludge S2 can be efficiently discharged from the oil tank.

(4) Since the crude oil is contained in the hard sludge cleaning liquid, the kinematic viscosity of the cleaning liquid is low, thereby facilitating the discharge of the sludge. Particularly, since the amount of LCO is 2.0 times as much as the amount of the hard sludge S2 and the amount of the crude oil is 0.5 times as much as the amount of the hard sludge S2, the sludge can be more efficiently discharged.

(5) Since the sludge S dissolved in the cleaning liquid is discharged from the oil tank 1 and returned to the oil tank 1 and further the cleaning liquid in which the sludge S is dissolved is back-flowed to the oil tank 1, by the forward flow of the cleaning liquid to be flowed from inside the oil tank 1 and the back-flow of the cleaning liquid to be flowed into the oil tank 1, the sludge S can be effectively dissolved in the cleaning liquid. Accordingly, the sludge S can be efficiently discharged.

(6) Since the cleaning and discharge of the hard sludge S2 is conducted after the cleaning and discharge of the soft sludge S1, the oil tank 1 can be efficiently cleaned.

(7) Since the amount of the sludge S accumulated inside the oil tank 1 is measured after the crude oil is discharged and before the nozzle 310 is inserted into the support opening 14, the amount of the fluid discharged from the nozzle relative to the sludge S can be set appropriate.

(8) The amount of the sludge S accumulated inside the oil tank 1 is measured before the cleaning liquid in which the sludge S is dissolved is discharged. Since the cleaning liquid in which the sludge S is dissolved is discharged to the outside of the oil tank 1 after checking no sludge S is left on the bottom of the oil tank 1, the sludge S can be reliably discharged.

(9) Since water is fed into the oil tank 1 after discharging the fluid in which the sludge S is dissolved, even if the sludge S is left on the bottom of the oil tank 1, the sludge S can be discharged to the outside with water and deodorization inside the oil tank 1 can be conducted.

(10) The cleaning device includes: the cleaning liquid injection line 3 having the nozzle 310 for injecting the fluid containing LCO over the sludge S accumulated inside the oil tank 1; the circulation line 2 for discharging the sludge S dissolved in the cleaning liquid containing LCO and the crude oil from the oil tank 1 and for returning the cleaning liquid to the oil tank 1; the discharge line 6 for discharging the cleaning liquid in which the sludge S is dissolved from the oil tank 1; and the cleaning liquid feeding line 4 that is connected to the circulation line 2 and feeds the cleaning liquid to the nozzle 310, in which the posture of the nozzle 310 can be altered. Accordingly, the cleaning liquid can be spread all over inside the oil tank 1.

(11) Since the heat exchanger 7 for heating the cleaning liquid in which the sludge S is dissolved and which is fed from the oil tank 1 is provided to the circulation line 2, the cleaning liquid to be fed to the oil tank 1 is kept at a predetermined temperature, so that dissolution of the sludge S accumulated inside the oil tank 1 is promoted.

(12) The heat exchanger 7 includes: the casing 71; and the fluid flow section 72 and the hot water flow section 73 provided inside the casing 71, in which the fluid flow section 72 includes: the tubes 74; and the aggregation separation device 75 that is provided inside the tube 74 and separates the aggregations of the sludge S dissolved in the cleaning liquid. Accordingly, when the cleaning liquid in which the sludge S is dissolved passes through the aggregation separation device 75 inside the tube 74, mutually bonded aggregations collide with the aggregation separation device 75 to be turbulently stirred and are fed to the nozzle 310. Accordingly, since no sludge S containing large aggregation is contained in the cleaning liquid fed from the nozzle 310 to the oil tank 1, the pipes and the like are not clogged, so that the discharge operation can be easily conducted.

EXAMPLE(S)

Examples for demonstrating the cleaning effects of the exemplary embodiment will be described.

In Examples, sludge adhering on the oil tank 1 was prepared. The sludge and a cleaning liquid were put into a drum. The sludge was dissolved and stirred in the cleaning liquid. At that time, a flash point, pour point, kinematic viscosity and water-containing sludge content were measured and a visual evaluation under the environment at 5 degrees C. was conducted.

At this time, in order to ensure the fluidity in the tank, a reference value of the pour point was set at −10.0 degrees C.

A reference value of the kinematic viscosity at 50 degrees C. was set at 100 $mm^2/s$ or less in consideration of 500 Pa·S of a viscosity limit of a centrifugal pump to be used as the pump.

A reference value of the water-containing sludge content was set at 10 mass % or less in consideration of 1 mass % (a reference value) of a topper feed.

The drum has an inner diameter of 0.566 m, a height of 0.890 m, and an inner volume of 0.224 $m^3$.

Sludge adhering on the oil tank 1 was prepared. When the sludge was analyzed, components of the sludge were 27 mass % of wax, 10 mass % of asphaltene, 59 mass % of light hydrocarbons, 2 mass % of a residue and 2 mass % of water.

Example 1

Cleaning Liquid: LCO, Crude Oil and Chemical Agent

Provided that the mass of the sludge was defined as 1, the mass of LCO was 2 and the mass of the crude oil was 0.5. CLO was not contained. Specifically, into the above-described drum, the sludge was fed to reach 150 mm of a depth of the drum, LCO was fed to reach 300 mm of the depth, and the crude oil was fed to reach 75 mm of the depth. A heating temperature was 40 degrees C.

Chemical agent: containing 20 mass % of carboxy betaine, 20 mass % of sulfo-betaine and 60 mass % of limonene (product number: HKS-101A, manufactured by SOFTARD INDUSTRIES CO., LTD.)

The chemical agent was contained at 0.5 mass % of an entire cleaning liquid. Specifically, 0.439 kg of the chemical agent was fed into the drum.

After the sludge was stirred and dissolved in the cleaning liquid of Example 1 in the drum, the flash point, pour point, kinematic viscosity and water-containing sludge content were measured and a visual evaluation of the obtained liquid was conducted.

The flash point was the room temperature (25 degrees C.). The pour point was −27.5 degrees C. The kinematic viscosity was 10.48 $mm^2/s$. The water-containing sludge content was 4 mass %. The pour point, kinematic viscosity and water-containing sludge content in Example 1 were appropriate.

A result of the visual evaluation was that the obtained liquid was non-viscous and only an extremely thin film of the wax was deposited on a surface of the obtained liquid. Since no defect was observed in the visual evaluation, this result of the visual evaluation was rated as the best.

Example 2

In Example 2, the ratio of the chemical agent was different from that in Example 1, but other conditions were the same as those in Example 1.

Chemical agent: a chemical agent containing the same components as those in Example 1 (product number: S-620, manufactured by Clean Harbors).

The chemical agent was contained at 0.2 mass % of the entire cleaning liquid. 0.175 kg of the chemical agent was fed.

The flash point was the room temperature (25 degrees C.). The pour point was −22.5 degrees C. The kinematic viscosity was 6.734 $mm^2/s$. The water-containing sludge content was 4 mass %.

The pour point, kinematic viscosity and water-containing sludge content in Example 2 were appropriate.

A result of the visual evaluation was that the obtained liquid was non-viscous and only an extremely thin film of the wax was deposited on a surface of the obtained liquid. Since no defect was observed in the visual evaluation, this result of the visual evaluation was rated as the best.

Example 3

Cleaning Liquid: LCO and Chemical Agent

Provided that the mass of the sludge was defined as 1, the mass of LCO was 2. The crude oil and CLO were not contained. Specifically, into the above-described drum, the sludge was fed to reach 175 mm of the depth of the drum and LCO was fed to reach 350 mm of the depth. A heating temperature was 40 degrees C.

Chemical agent (product number: HKS-101A): contained at 0.5 mass % of the entire cleaning liquid. Specifically, 0.409 kg of the chemical agent was fed.

After the sludge was stirred and dissolved in the cleaning liquid of Example 3, the flash point, pour point, kinematic viscosity and water-containing sludge content were measured and a visual evaluation of the obtained liquid was conducted.

The flash point was the room temperature (25 degrees C.). The pour point was −27.5 degrees C. The kinematic viscosity was 17.41 $mm^2/s$. The water-containing sludge content was 4 mass %. The pour point, kinematic viscosity and water-containing sludge content in Example 3 were appropriate.

A result of the visual evaluation was that the obtained liquid was non-viscous and only an extremely thin film of the wax was deposited on a surface of the obtained liquid. Since no defect was observed in the visual evaluation, this result of the visual evaluation was rated as the best.

Example 4

In Example 4, the ratio of the chemical agent was different from that in Example 3, but other conditions were the same as those in Example 3. Provided that the mass of the sludge was defined as 1, the mass of LCO was 2.

The product number S-620 manufactured by Clean Harbors was used as the chemical agent. The chemical agent was contained at 0.2 mass % of the entire cleaning liquid. Specifically, 0.164 kg of the chemical agent was fed.

After the sludge was stirred and dissolved in the cleaning liquid of Example 4, the flash point, pour point, kinematic viscosity and water-containing sludge content were measured and a visual evaluation of the obtained liquid was conducted.

The flash point was the room temperature (25 degrees C.). The pour point was −22.5 degrees C. The kinematic viscosity was 9.532 $mm^2/s$. The water-containing sludge content was 4 mass %. The pour point, kinematic viscosity and water-containing sludge content in Example 4 were appropriate.

A result of the visual evaluation was that the obtained liquid was non-viscous and only an extremely thin film of the wax was deposited on a surface of the obtained liquid. Since no defect was observed in the visual evaluation, this result of the visual evaluation was rated as the best.

Example 5

In Example 5, the cleaning liquid was different from that in Example 3 in containing no chemical agent, but other conditions were the same as those in Example 3. Provided that the mass of the sludge was defined as 1, the mass of LCO was 2 and CLO and the crude oil were not contained.

After the sludge was dissolved in the cleaning liquid of Example 5, the flash point, pour point, kinematic viscosity and water-containing sludge content were measured and a visual evaluation of the obtained liquid was conducted.

The flash point was 31 degrees C. The pour point was −25 degrees C. The kinematic viscosity was 13.44 $mm^2/s$. The water-containing sludge content was 6 mass %. The pour point, kinematic viscosity and water-containing sludge content in Example 5 were appropriate.

A result of the visual evaluation was that only an extremely thin film of the wax was deposited on a surface of the obtained liquid. Since no defect was observed in the visual evaluation, this result of the visual evaluation was rated as the second best to Examples 1 to 4 from a comprehensive view point.

Example 6

Cleaning Liquid: LCO and Crude Oil

Provided that the mass of the sludge is defined as 1, the mass of LCO is 1 and the mass of the crude oil is 0.5. CLO and the chemical agent were not contained. Specifically, into the above-described drum, the sludge was fed to reach 210 mm of the depth of the drum and the crude oil was fed to reach 105 mm of the depth. A heating temperature was 40 degrees C.

After the sludge was stirred and dissolved in the cleaning liquid of Example 6, the flash point, pour point, kinematic viscosity and water-containing sludge content were measured and a visual evaluation of the obtained liquid was conducted.

The flash point was the room temperature (25 degrees C.). The pour point was −20 degrees C. The kinematic viscosity was 28.77 $mm^2/s$. The water-containing sludge content was 6 mass %. The pour point, kinematic viscosity and water-containing sludge content in Example 6 were appropriate.

A result of the visual evaluation was that the obtained liquid has a low viscosity and fluidity. Since no defect was observed in the visual evaluation, this result of the visual evaluation was rated as the second best to Examples 1 to 4 from a comprehensive view point.

Example 7

In Example 7, the cleaning liquid was different from that in Example 6 in containing the chemical agent, but other conditions were the same as those in Example 6.

Provided that the mass of the sludge was defined as 1, the mass of LCO was 1 and the mass of the crude oil was 0.5. CLO was not contained.

The chemical agent (product number: HKS-101A, manufactured by SOFTARD INDUSTRIES CO., LTD.) was contained at 0.5 mass % of the entire cleaning liquid. Specifically, 0.369 kg of the chemical agent was fed.

After the sludge was stirred and dissolved in the cleaning liquid of Example 7, the flash point, pour point, kinematic viscosity and water-containing sludge content were measured and a visual evaluation of the obtained liquid was conducted.

The flash point was the room temperature (25 degrees C.). The pour point was −17.5 degrees C. The kinematic viscosity was 42.34 mm$^2$/s. The water-containing sludge content was 4 mass %. The pour point, kinematic viscosity and water-containing sludge content in Example 7 were appropriate.

A result of the visual evaluation was that the obtained liquid has a low viscosity and fluidity. Since no defect was observed in the visual evaluation, this result of the visual evaluation was rated as the second best to Examples 1 to 4 from a comprehensive view point.

Example 8

In Example 8, the cleaning liquid was different from that in Example 6 in containing the chemical agent, but other conditions were the same as those in Example 6.

Provided that the mass of the sludge was defined as 1, the mass of LCO was 1 and the mass of the crude oil was 0.5. CLO is not contained.

The chemical agent (product number: S-620, manufactured by Clean Harbors) was contained at 0.2 mass % of the entire cleaning liquid. Specifically, 0.147 kg of the chemical agent was fed.

After the sludge was stirred and dissolved in the cleaning liquid of Example 8, the flash point, pour point, kinematic viscosity and water-containing sludge content were measured and a visual evaluation of the obtained liquid was conducted.

The flash point was the room temperature (25 degrees C.). The pour point was −30 degrees C. The kinematic viscosity was 31.24 mm$^2$/s. The water-containing sludge content was 4 mass %. The pour point, kinematic viscosity and water-containing sludge content in Example 8 were appropriate.

A result of the visual evaluation was that the obtained liquid has a low viscosity and fluidity. Since no defect was observed in the visual evaluation, this result of the visual evaluation was rated as the second best to Examples 1 to 4 from a comprehensive view point.

Example 9

Cleaning Liquid: LCO, CLO and Chemical Agent

Provided that the mass of the sludge was defined as 1, the mass of LCO was 1 and the mass of CLO was 0.5. The crude oil was not contained. Specifically, into the above-described drum, the sludge was fed to reach 210 mm of the depth of the drum, LCO was fed to reach 210 mm of the depth and CLO was fed to reach 105 mm of the depth. A heating temperature was 40 degrees C.

The chemical agent (product number: S-620): contained at 0.2 mass % of the entire cleaning liquid. Specifically, 0.147 kg of the chemical agent was fed.

After the sludge was stirred and dissolved in the cleaning liquid of Example 9, the flash point, pour point, kinematic viscosity and water-containing sludge content were measured and a visual evaluation of the obtained liquid was conducted.

The flash point was the room temperature (25 degrees C.). The pour point was −22.5 degrees C. The kinematic viscosity was 41.58 mm$^2$/s. The water-containing sludge content was 4 mass %. The pour point and the kinematic viscosity in Example 9 were appropriate.

A result of the visual evaluation was that the obtained liquid has a high viscosity and a slight fluidity. Since no defect was observed in the visual evaluation, this result of the visual evaluation was rated as the second best to Examples 1 to 4 from a comprehensive view point.

Example 10

In Example 10, the respective ratios of CLO and the chemical agent were different from those in Example 9, but other conditions were the same as those in Example 9.

Provided that the mass of the sludge was defined as 1, the mass of LCO was 1 and the mass of CLO was 1.0. Specifically, into the above-described drum, the sludge was fed to reach 175 mm of the depth of the drum, LCO was fed to reach 175 mm of the depth and CLO was fed to reach 175 mm of the depth. A heating temperature was 40 degrees C.

The chemical agent (product number: HKS-101A) was contained at 0.5 mass % of the entire cleaning liquid. Specifically, 0.409 kg of the chemical agent was fed.

After the sludge was stirred and dissolved in the cleaning liquid of Example 10, the flash point, pour point, kinematic viscosity and water-containing sludge content were measured and a visual evaluation of the obtained liquid was conducted.

The flash point was the room temperature (25 degrees C.). The pour point was −25 degrees C. The kinematic viscosity was 49.81 mm$^2$/s. The water-containing sludge content was 4 mass %. The pour point and the kinematic viscosity in Example 10 were appropriate.

A result of the visual evaluation was that the obtained liquid has a high viscosity and a slight fluidity. Since no defect was observed in the visual evaluation, this result of the visual evaluation was rated as the second best to Examples 1 to 4 from a comprehensive view point.

Example 11

Cleaning Liquid: LCO, CLO, Crude Oil and Chemical Agent

Provided that the mass of the sludge was defined as 1, the mass of LCO was 1, the mass of CLO was 0.5, and the mass of the crude oil was 0.5. Specifically, into the above-described drum, the sludge was fed to reach 180 mm of the depth of the drum, LCO was fed to reach 180 mm of the depth, CLO was fed to reach 90 mm of the depth, and the crude oil was fed to reach 90 mm of the depth. A heating temperature was 40 degrees C.

The chemical agent (product number: HKS-101A) was contained at 0.5 mass % of the entire cleaning liquid. Specifically, 0.421 kg of the chemical agent was fed.

After the sludge was stirred and dissolved in the cleaning liquid of Example 11, the flash point, pour point, kinematic viscosity and water-containing sludge content were measured and a visual evaluation of the obtained liquid was conducted.

The flash point was the room temperature (25 degrees C.). The pour point was −30 degrees C. The kinematic viscosity was 27.52 mm$^2$/s. The water-containing sludge content was 6 mass %. The pour point, kinematic viscosity and water-containing sludge content in Example 11 were appropriate.

A result of the visual evaluation was that the obtained liquid has an intermediate viscosity and fluidity. Since no defect was observed in the visual evaluation, this result of the visual evaluation was rated as the second best to Examples 1 to 4 from a comprehensive view point.

Example 12

In Example 12, the ratio of the chemical agent was different from that in Example 11, but other conditions were the same as those in Example 11.

Provided that the mass of the sludge was defined as 1, the mass of LCO was 1.0, the mass of CLO was 0.5, and the mass of the crude oil was 0.5.

The chemical agent (product number: S-620) was contained at 0.2 mass % of the entire cleaning liquid. Specifically, 0.168 kg of the chemical agent was fed.

After the sludge was stirred and dissolved in the cleaning liquid of Example 12, the flash point, pour point, kinematic viscosity and water-containing sludge content were measured and a visual evaluation of the obtained liquid was conducted.

The flash point was the room temperature (25 degrees C.). The pour point was −30 degrees C. The kinematic viscosity was 26.18 mm$^2$/s. The water-containing sludge content was 6 mass %. The pour point, kinematic viscosity and water-containing sludge content in Example 12 were appropriate.

A result of the visual evaluation was that the obtained liquid has an intermediate viscosity and fluidity. Since no defect was observed in the visual evaluation, this result of the visual evaluation was rated as the second best to Examples 1 to 4 from a comprehensive view point.

Example 13

In Example 13, the cleaning liquid was different from that in Example 9 in containing no chemical agent, but other conditions were the same as those in Example 9. Provided that the mass of the sludge was defined as 1, the mass of LCO was 1 and the mass of CLO was 0.5. The crude oil and the chemical agent were not contained.

After the sludge was stirred and dissolved in the cleaning liquid of Example 13, the flash point, pour point, kinematic viscosity and water-containing sludge content were measured and a visual evaluation of the obtained liquid was conducted.

The flash point was the room temperature (25 degrees C.). The pour point was −30 degrees C. The kinematic viscosity was 73.16 mm$^2$/s. The water-containing sludge content was 8 mass %. The pour point, kinematic viscosity and water-containing sludge content in Example 13 were appropriate.

A result of the visual evaluation was that the obtained liquid has a high viscosity and a slight fluidity. Since no defect was observed in the visual evaluation, this result of the visual evaluation was rated as the second best to Examples 5 to 12 from a comprehensive view point.

Example 14

In Example 14, the ratio of the chemical agent was different from that in Example 9, but other conditions were the same as those in Example 9. Provided that the mass of the sludge was defined as 1, the mass of LCO was 1 and the mass of CLO was 0.5. The crude oil was not contained.

The chemical agent (product number: HKS-101A) was contained at 0.5 mass % of the entire cleaning liquid. Specifically, 0.369 kg of the chemical agent was fed.

After the sludge was stirred and dissolved in the cleaning liquid of Example 14, the flash point, pour point, kinematic viscosity and water-containing sludge content were measured and a visual evaluation of the obtained liquid was conducted.

The flash point was the room temperature (25 degrees C.). The pour point was −27.5 degrees C. The kinematic viscosity was 56.5 mm$^2$/s. The water-containing sludge content was 2 mass %. The pour point, kinematic viscosity and water-containing sludge content in Example 14 were appropriate.

A result of the visual evaluation was that the obtained liquid has a high viscosity and a slight fluidity. Since no defect was observed in the visual evaluation, this result of the visual evaluation was rated as the second best to Examples 5 to 12 from a comprehensive view point.

Comparative 1

Cleaning Liquid: CLO

Provided that the mass of the sludge was defined as 1, the mass of CLO was 1. LCO, the crude oil and the chemical agent were not contained. Specifically, into the above-described drum, the sludge was fed to reach 265 mm of the depth of the drum and LCO was fed to reach 265 mm of the depth. A heating temperature was 40 degrees C.

After the sludge was stirred and dissolved in the cleaning liquid of Comparative 1, the flash point, pour point, kinematic viscosity and water-containing sludge content were measured and a visual evaluation of the obtained liquid was conducted.

The flash point was the room temperature (25 degrees C.). The pour point was 5.0 degrees C. The kinematic viscosity was 853 mm$^2$/s. The water-containing sludge content was 16 mass %. The pour point, kinematic viscosity and water-containing sludge content in Comparative 1 were not appropriate.

A result of the visual evaluation was that the obtained liquid has a high viscosity and a poor fluidity. This result of the visual evaluation was rated as the worst from a comprehensive view point.

Comparative 2

In Comparative 2, the ratio of CLO was different from that in Comparative 1, but other conditions were the same as those in Comparative 1.

Provided that the mass of the sludge was defined as 1, the mass of CLO was 2. LCO, the crude oil and the chemical agent were not contained.

After the sludge was stirred and dissolved in the cleaning liquid of Comparative 2, the flash point, pour point, kinematic viscosity and water-containing sludge content were measured and a visual evaluation of the obtained liquid was conducted.

The flash point was the room temperature (25 degrees C.). The pour point was −2.5 degrees C. The kinematic viscosity was 219 mm$^2$/s. The water-containing sludge content was 6 mass %. The pour point and kinematic viscosity in Comparative 1 were not appropriate.

A result of the visual evaluation was that the obtained liquid has a high viscosity and a poor fluidity. This result of the visual evaluation was rated as the worst from a comprehensive view point.

Comparative 3

In Comparative 3, the cleaning liquid was different from that in Comparative 1 in containing chemical agent, but other conditions were the same as those in Comparative 1.

Provided that the mass of the sludge was defined as 1, the mass of CLO was 1. The chemical agent (product number: HKS-101A) was contained at 0.5 mass % of the entire cleaning liquid. Specifically, 0.310 kg of the chemical agent was fed. LCO and the crude oil were not contained.

After the sludge was stirred and dissolved in the cleaning liquid of Comparative 3, the flash point, pour point, kinematic viscosity and water-containing sludge content were measured and a visual evaluation of the obtained liquid was conducted.

The flash point was the room temperature (25 degrees C.). The pour point was −5 degrees C. The kinematic viscosity was 431 mm$^2$/s. The water-containing sludge content was 20 mass %. The pour point, kinematic viscosity and water-containing sludge content in Comparative 3 were not appropriate.

A result of the visual evaluation was that the obtained liquid has a high viscosity and a poor fluidity. This result of the visual evaluation was rated as the worst from a comprehensive view point.

Comparative 4

In Comparative 4, the cleaning liquid was different from that in Comparative 1 in containing chemical agent, but other conditions were the same as those in Comparative 1.

Provided that the mass of the sludge was defined as 1, the mass of CLO was 1. The chemical agent (product number: S-620) was contained at 0.2 mass % of the entire cleaning liquid. 0.124 kg of the chemical agent was fed. LCO and the crude oil were not contained.

After the sludge was stirred and dissolved in the cleaning liquid of Comparative 4, the flash point, pour point, kinematic viscosity and water-containing sludge content were measured and a visual evaluation of the obtained liquid was conducted.

The flash point was the room temperature (25 degrees C.). The pour point was 0 degrees C. The kinematic viscosity was 817 mm$^2$/s. The water-containing sludge content was 16 mass %. The pour point, kinematic viscosity and water-containing sludge content in Comparative 4 were not appropriate.

A result of the visual evaluation was that the obtained liquid has a high viscosity and a poor fluidity. This result of the visual evaluation was rated as the worst from a comprehensive view point.

Comparative 5

In Comparative 5, the ratio of CLO was different from that in Comparative 1, but other conditions were the same as those in Comparative 1.

Provided that the mass of the sludge was defined as 1, the mass of CLO was 2.

The chemical agent (product number: HKS-101A) was contained at 0.5 mass % of the entire cleaning liquid. LCO and the crude oil were not contained.

After the sludge was stirred and dissolved in the cleaning liquid of Comparative 5, the flash point, pour point, kinematic viscosity and water-containing sludge content were measured and a visual evaluation of the obtained liquid was conducted.

The flash point was the room temperature (25 degrees C.). The pour point was −7.5 degrees C. The kinematic viscosity was 234 mm$^2$/s. The water-containing sludge content was 6 mass %. The pour point and kinematic viscosity in Comparative 5 were not appropriate.

A result of the visual evaluation was that the obtained liquid has a high viscosity and a poor fluidity. This result of the visual evaluation was rated as the worst from a comprehensive view point.

Comparative 6

In Comparative 6, the cleaning liquid was different from that in Comparative 1 in the ratio of CLO and in containing chemical agent, but other conditions were the same as those in Comparative 1.

Provided that the mass of the sludge was defined as 1, the mass of CLO was 2. The chemical agent (product number: S-620) was contained at 0.2 mass % of the entire cleaning liquid. LCO and the crude oil were not contained.

After the sludge was stirred and dissolved in the cleaning liquid of Comparative 6, the flash point, pour point, kinematic viscosity and water-containing sludge content were measured and a visual evaluation of the obtained liquid was conducted.

The flash point was the room temperature (25 degrees C.). The pour point was −17.5 degrees C. The kinematic viscosity was 193 mm$^2$/s. The water-containing sludge content was 4 mass %. The kinematic viscosity in Comparative 6 was not appropriate.

A result of the visual evaluation was that the obtained liquid has a high viscosity and a poor fluidity. This result of the visual evaluation was rated as the worst from a comprehensive view point.

Comparative 7

Cleaning liquid: LCO, Crude Oil and Chemical Agent

Provided that the mass of the sludge was defined as 1, the mass of CLO was 1 and the mass of the crude oil was 0.5. LCO was not contained. Specifically, into the above-described drum, the sludge was fed to reach 210 mm of the depth of the drum, CLO was fed to reach 210 mm of the depth and the crude oil was fed to reach 105 mm of the depth. A heating temperature was 40 degrees C.

The chemical agent (product number: HKS-101A) was contained at 0.5 mass % of the entire cleaning liquid. Specifically, 0.369 kg of the chemical agent was fed.

After the sludge was stirred and dissolved in the cleaning liquid of Comparative 7, the flash point, pour point, kinematic viscosity and water-containing sludge content were measured and a visual evaluation of the obtained liquid was conducted.

The flash point was the room temperature (25 degrees C.). The pour point was −2.5 degrees C. The kinematic viscosity was 143 mm$^2$/s. The water-containing sludge content was 10 mass %. The pour point, kinematic viscosity and water-containing sludge content in Comparative 7 were not appropriate.

A result of the visual evaluation was that the obtained liquid has a high viscosity and a poor fluidity. This result of the visual evaluation was rated as the worst from a comprehensive view point.

From the above Examples, the cleaning liquid containing LCO at the amount of 1 or more when the mass of the sludge is defined as 1 exhibited favorable values of the kinematic viscosity and the water-containing sludge content. In other words, when the used mass of LCO was the same as the mass of the sludge, both of the fluidity and the kinematic viscosity exhibited a value for expressing solubility. Particularly, when the mass of LCO was determined to be twice as much as the mass of the sludge being 1, a suitable result was obtained.

Further, when CLO was used, the solubility can be ensured by using LCO at the same time. In contrast, it is understood as shown in Comparatives that, when the cleaning liquid contains no LCO, all of the pour point, the kinematic viscosity and the water-containing sludge content fall out of the respective reference values to entail difficulty in discharging the sludge.

Moreover, it is understood from Examples 1 to 4 that, when the cleaning liquid contained a predetermined amount of the chemical agent, the kinematic viscosity became lower than that of the cleaning liquid containing no chemical agent, thereby facilitating discharging the sludge from the oil tank. On the other hand, when the cleaning liquid contained no chemical agent, the water-containing sludge content was increased. It is also preferable to add the chemical agent in terms of thixotropy. As is understood from a comparison between Example 1 and Example 3 and a comparison between Example 2 and Example 4, the kinematic viscosity of the cleaning liquid containing the crude oil was lower than that of the cleaning liquid containing no crude oil. Due to the lower kinematic viscosity, it is understood that the sludge can be efficiently discharged. Provided that the amount of LCO is 2.0 times as much as the amount of the sludge and the amount of the crude oil is 0.5 times as much as the amount of the sludge, it is understood that all the pour point, the kinematic viscosity and the water-containing sludge content become the best values.

Next, Examples for demonstrating generation of a difference in the pour point of the cleaning liquid, in which the sludge is dissolved, between at an upper section and at a lower section inside the oil tank 1 will be described.

Firstly, the sludge was once dissolved in the cleaning liquid in Example 1 and subsequently was left still, where the pour points in upper and lower layers of the drum were measured. As a result, the pour point in the upper layer was –50 degrees C., whereas the pour point in the lower layer was –30 degrees C.

Next, the same experiment was also conducted in Example 3. The pour point in the upper layer was –27.5 degrees C., whereas the pour point in the lower layer was –47.5 degrees C.

As described above, since the difference in the pour point of the cleaning liquid, which is housed inside the drum and in which the sludge is dissolved, between at the upper section and at the lower section is generated, it can be easily expected that the difference in the pour point between the upper section and at the lower section is also generated in the oil tank larger than the drum.

It should be understood that the scope of the invention is not limited to the above-described exemplary embodiment but includes modifications as long as the modifications are compatible with the invention.

For instance, in the above exemplary embodiment, the existing opening to which the nozzle is inserted is provided by the support opening 14. However, the existing opening of the invention is not limited to the support opening 14 as long as the opening is formed in advance on the roof. For instance, the existing opening may be a manhole.

Although the amount of the sludge S accumulated inside the oil tank 1 is measured before the nozzle 310 is inserted into the support opening 14 and before the fluid in which the sludge S is dissolved is discharged, this measurement step may be omitted in the invention.

Further, feeding of water to the oil tank 1 after the fluid in which the sludge S is dissolved is discharged from the oil tank 1 may be omitted.

In the invention, the heat exchanger 7 is not necessarily provided. Even when the heat exchanger is provided, the aggregation separation device 75 is not necessarily provided to the tube 74.

Even when the aggregation separation device 75 is provided to the tube 74, the arrangement of the aggregation separation device 75 in the invention is not limited to the arrangement thereof in the above exemplary embodiment. Specifically, as long as the aggregation separation device 75 is configured to again separate mutually combined aggregations by a mechanical force, the arrangement of the aggregation separation device 75 is not specifically limited. For instance, the aggregation separation device 75 may be provided by glass wool with which an inside of the tube 74 is filled.

Even when the aggregation separation device 75 is provided, it is not necessary to provide the aggregation separation device 75 to the heat exchanger. In other words, a sludge separator provided with the aggregation separation device may be provided to the circulation line in addition to the heat exchanger provided to the circulation line. A heat source for heating the cleaning liquid in which the sludge is dissolved may be provided to the sludge separator in addition to the heat exchanger. Alternatively, the heat source per se may not be provided.

Further, in the invention, the hard sludge cleaning liquid may be used as the soft sludge cleaning liquid.

In the invention, it is not necessarily required to conduct the back-flow of the cleaning liquid to be flowed into the oil tank 1.

The invention claimed is:

1. A method of cleaning an inside of an oil tank provided with a roof having an existing opening, the method comprising:
    a preparation step of inserting a nozzle into the existing opening;
    a cleaning step of injecting from the nozzle cleaning liquid comprising LCO (Light Cycle Oil) obtained by distillation of hydrocarbon oil by fluid catalytic cracking to sludge accumulated in the inside of the oil tank after crude oil is discharged from the oil tank to dissolve the sludge with cleaning liquid, discharging cleaning liquid in which the sludge is dissolved from the oil tank, and returning cleaning liquid in which the sludge is dissolved to the oil tank; and
    a sludge discharging step of discharging cleaning liquid in which the sludge is dissolved from the oil tank after cleaning the inside of the oil tank, wherein
    the cleaning step comprises: a circulation step of discharging cleaning liquid in which the sludge is dissolved from the oil tank and returning cleaning liquid in which the sludge is dissolved to the oil tank; and a back-flow step of back-flowing cleaning liquid in which the sludge is dissolved in a direction opposite from a circulation direction of cleaning liquid in which the sludge is dissolved in the circulation step,
    the sludge comprises a soft sludge forming an upper layer and a hard sludge forming a lower layer,
    the cleaning liquid comprises a soft sludge cleaning liquid for dissolving the soft sludge and a hard sludge cleaning liquid for dissolving the hard sludge, the soft sludge cleaning liquid comprises the LCO and crude oil,
the hard sludge cleaning liquid comprises the LCO and a chemical agent comprising a surfactant and limonene,
the cleaning step comprises: a soft sludge cleaning step of cleaning the soft sludge with the soft sludge cleaning liquid; and a hard sludge cleaning step of cleaning the hard sludge with the hard sludge cleaning liquid,
in the soft sludge cleaning step, the circulation step is conducted for a predetermined time and subsequently the back-flow step is conducted, and
in the hard sludge cleaning step, the circulation step and the back-flow step are repeated.

2. The method according to claim 1, wherein
the hard sludge cleaning liquid comprises an amount of the LCO at 1.0 time or more relative to an amount of the hard sludge accumulated in the oil tank.

3. The method according to claim 2, wherein
the hard sludge cleaning liquid comprises crude oil.

4. The method according to claim 3, wherein
the sludge discharging step comprises: a soft sludge discharging step of discharging the cleaning liquid in which the soft sludge is dissolved from the oil tank; and a hard sludge discharging step of discharging the cleaning liquid in which the hard sludge is dissolved from the oil tank, and
the hard sludge cleaning step is conducted after the soft sludge discharging step.

5. The method according to claim 1, wherein
the preparation step comprises a sludge measurement step of measuring an amount of the sludge accumulated in the inside of the oil tank after the crude oil is discharged and before the nozzle is inserted to the existing opening.

6. The method according to claim 1, wherein
the sludge discharging step comprises a sludge measurement step of measuring an amount of the sludge accumulated in the inside of the oil tank.

7. The method according to claim 1, wherein
the sludge discharging step further comprises feeding water to the oil tank after the fluid in which the sludge is dissolved is discharged.

\* \* \* \* \*